United States Patent [19]

Togino

[11] Patent Number: 6,104,539
[45] Date of Patent: Aug. 15, 2000

[54] DECENTERED PRISM OPTICAL SYSTEM

[75] Inventor: Takayoshi Togino, Koganei, Japan

[73] Assignee: Olympus Optical Co., Ltd., Tokyo, Japan

[21] Appl. No.: 09/055,966

[22] Filed: Apr. 7, 1998

[51] Int. Cl.[7] .................................................. G02B 27/14
[52] U.S. Cl. ........................ 359/637; 359/633; 359/834
[58] Field of Search .................................. 359/629–640, 359/831–837

[56] References Cited

U.S. PATENT DOCUMENTS

| | | |
|---|---|---|
| 3,810,221 | 5/1974 | Plummer . |
| 3,836,931 | 9/1974 | Plummer . |
| 5,701,202 | 12/1997 | Takahashi . |
| 5,706,136 | 1/1998 | Okuyama et al. . |

FOREIGN PATENT DOCUMENTS

| | | |
|---|---|---|
| 687 932 | 12/1995 | European Pat. Off. . |
| 730 183 | 9/1996 | European Pat. Off. . |
| 7-333551 | 12/1995 | Japan . |
| 8-234137 | 9/1996 | Japan . |
| 8-313829 | 11/1996 | Japan . |
| 8-320452 | 12/1996 | Japan . |

*Primary Examiner*—Georgia Epps
*Assistant Examiner*—David N. Spector
*Attorney, Agent, or Firm*—Pillsbury Madison & Sutro LLP

[57] ABSTRACT

A decentered prism optical system suitable for use as an ocular optical system used in combination with an objective optical system and favorably corrected for pupil aberration. A prism optical system (7) which receives an image formed by an objective lens includes a decentered prism (7) having at least three surfaces (3 to 5) decentered with respect to each other, wherein the space between the at least three surfaces (3 to 5) is filled with a transparent medium having a refractive index not smaller than 1.3. The optical path is reflected at least twice in the optical system (7), and the optical paths of light rays do not intersect each other. At least one reflecting surface (4) has a rotationally asymmetric surface configuration having no axis of rotational symmetry in nor out of the surface. The optical system has both the function of optically transmitting a pupil (1) by image formation and the function of optically transmitting an image and is satisfactorily corrected for pupil aberration.

30 Claims, 15 Drawing Sheets

DECENTERED PRISM OPTICAL SYSTEM

BACKGROUND OF THE INVENTION

The present invention relates to a decentered prism optical system and, more particularly, to a decentered prism optical system applicable to an ocular optical system which enlarges a first-order image formed by an objective lens of a microscope, a telescope, etc.

Examples of conventionally known decentered prism optical systems Include those disclosed in Japanese Patent Application Unexamined Publication Number [hereinafter referred to as "JP(A)"] 7-333551 and 8-234137. The present applicant has also proposed decentered prism optical systems in JP(A) 8-320452 and 8-313829. Every one of these known decentered prism optical systems is designed as an image pickup optical system or an ocular optical system, but not corrected for pupil aberration (i.e. aberration concerning the image formation of a pupil transmitted).

In an ocular optical system used in combination with an objective optical system, an exit pupil of an objective lens is projected onto the iris position of an observer's eyeball through the ocular optical system. If the projected pupil is not favorably corrected for pupil aberration, the exit pupil of the ocular optical system is unfavorably aberrated. Consequently, even if the observer's eyeball is placed at the position of the exit pupil of the ocular optical system, a part of the image field of the image for observation is vignetted and thus becomes impossible to observe.

SUMMARY OF THE INVENTION

In view of the above-described problems associated with the prior art, an object of the present invention is to provide a decentered prism optical system which is suitable for use as an ocular optical system used in combination with an objective optical system and which is favorably corrected for pupil aberration.

To attain the above-described object, the present invention provides a decentered prism optical system which receives an image formed by an objective lens. The decentered prism optical system includes a decentered prism having at least three surfaces which are decentered with respect to each other, wherein the space between the at least three surfaces is filled with a transparent medium having a refractive index not smaller than 1.3. The decentered prism is arranged such that the optical path is reflected at least twice in the optical system, and the optical paths of light rays do not intersect each other. At least one reflecting surface has a rotationally asymmetric surface configuration having no axis of rotational symmetry in nor out of the surface. The decentered prism optical system has both the function of optically transmitting a pupil by image formation and the function of optically transmitting an image and is satisfactorily corrected for pupil aberration.

In this case, the amount of pupil aberration is not more than 4 millimeters in terms of transverse aberration.

The arrangement may be such that the decentered prism includes a first surface, a second surface, and a third surface. The first surface has both a transmitting action through which a bundle of light rays enters the decentered prism or exits therefrom after passing through it and a reflecting action by which the ray bundle is bent in the decentered prism. The second surface is disposed to face the first surface. The third surface has a transmitting action through which the ray bundle exits from the decentered prism after passing through it or enters it. The second surface has a rotationally asymmetric surface configuration.

The reasons for adopting the above-described arrangements in the present invention, together with the functions thereof, will be described below.

First of all, the principle of the decentered prism optical system according to the present invention will be described with reference to FIG. 1, which illustrates an optical ray trace of a three-surface prism, which is the simplest arrangement in the present invention, for the purpose of facilitating the understanding of the subject matter of the present invention. In the case of FIG. 1, surfaces disposed along the optical path of a decentered prism optical system 7 consist essentially of three surfaces 3, 4 and 5 as viewed in the backward ray tracing. In the optical system 7, a bundle of light rays in the backward ray tracing first passes through a pupil 1 of the optical system 7 and enters the optical system 7 through a first surface 3 having both a transmitting action and a reflecting action. The incident light rays are reflected toward the pupil 1 by a second surface 4 which is disposed on a side of the optical system 7 remote from the pupil 1 and which has only a reflecting action. The reflected light rays are then reflected away from the pupil 1 by the first surface 3, which is disposed on a side of the optical system 7 closer to the pupil 1 and has both transmitting and reflecting actions. The reflected light rays pass through a third surface 5 which is disposed to face in a direction (Y-axis direction in the figure) approximately perpendicular to a direction (Z-axis direction in the figure) in which the first surface 3 and the second surface 4 face each other. The third surface 5 has only a transmitting action. Then, the light rays reach an image plane 6 to form an image thereon. It should be noted that reference numeral 2 denotes an optical axis.

In actuality, a first-order image produced by an objective optical system is formed on the image plane 6, and light rays from the first-order image travel along an optical path which is reverse to the above-described optical path and are projected into an observer's eyeball with the observer's iris position or eyeball rolling center as an exit pupil 1.

Thus, in the present invention, the surface Nos. of the optical system are counted in the order of backward ray tracing from the pupil 1 toward the image plane 6 as a general rule. In the following description, the decentered prism optical system 7 according to the present invention is discussed on the basis of the backward ray tracing, unless otherwise specified.

It should, however, be noted that the arrangement shown in FIG. 1 is merely an example, and that the decentered prism optical system 7 according to the present invention may be arranged such that it has four optical surfaces, or the number of reflections is larger than two, as shown in FIGS. 2 to 7 described below. In the case of FIG. 2, a decentered prism optical system 7 comprises a first surface 3, a second surface 4, a third surface 5, and a fourth surface 9. A bundle of light rays emanating from a first-order image on an image plane 6 enters the optical system 7 while being refracted through the third surface 5. The incident ray bundle is internally reflected by the fourth surface 9 and further internally reflected by the second surface 4. The reflected ray bundle is refracted through the first surface 3 and projected into an observer's eyeball with the observer's iris position or eyeball rolling center as an exit pupil 1.

In the case of FIG. 3, a decentered prism optical system 7 comprises a first surface 3, a second surface 4, a third surface 5, and a fourth surface 9. A bundle of light rays emanating from a first-order image on an image plane 6 enters the optical system 7 while being refracted through the third surface 5. The incident ray bundle is internally reflected by the fourth surface 9 and further internally reflected by the third surface 5. The reflected ray bundle is further internally reflected by the second surface 4 and refracted through the first surface 3 so as to be projected into an observer's eyeball with the observer's iris position or eyeball rolling center as an exit pupil 1.

In the case of FIG. 4, a decentered prism optical system 7 comprises a first surface 3, a second surface 4, a third surface 5, and a fourth surface 9. A bundle of light rays emanating from a first-order image on an image plane 6 enters the optical system 7 while being refracted through the third surface 5. The incident ray bundle is internally reflected by the second surface 4 and further internally reflected by the fourth surface 9. The reflected ray bundle is further internally reflected by the second surface 4 and refracted through the first surface 3 so as to be projected into an observer's eyeball with the observer's iris position or eyeball rolling center as an exit pupil 1.

In the case of FIG. 5, a decentered prism optical system 7 comprises a first surface 3, a second surface 4, a third surface 5, and a fourth surface 9. A bundle of light rays emanating from a first-order image on an image plane 6 enters the optical system 7 while being refracted through the second surface 4. The incident ray bundle is internally reflected by the third surface 5 and further internally reflected by the second surface 4. The reflected ray bundle is further internally reflected by the fourth surface 9 and further internally reflected by the second surface 4. The reflected ray bundle is refracted through the first surface 3 and projected into an observer's eyeball with the observer's iris position or eyeball rolling center as an exit pupil 1.

In the case of FIG. 6, a decentered prism optical system 7 comprises a first surface 3, a second surface 4, and a third surface 5. A bundle of light rays emanating from a first-order image on an image plane 6 enters the optical system 7 while being refracted through the third surface 5. The incident ray bundle is internally reflected by the first surface 3 and further internally reflected by the third surface 5. The reflected ray bundle is further internally reflected by the first surface 3 and then reflected by the second surface 4. The reflected ray bundle is refracted through the first surface 3 and projected into an observer's eyeball with the observer's iris position or eyeball rolling center as an exit pupil 1.

In the case of FIG. 7, a decentered prism optical system 7 comprises a first surface 3, a second surface 4, and a third surface 5. A bundle of light rays emanating from a first-order image on an image plane 6 enters the optical system 7 while being refracted through the first surface 3. The incident ray bundle is internally reflected by the third surface 5 and further internally reflected by the first surface 3. The reflected ray bundle is further internally reflected by the third surface 5 and further internally reflected by the first surface 3. The reflected ray bundle is reflected by the second surface 4 and refracted through the first surface 3 so as to be projected into an observer's eyeball with the observer's iris position or eyeball rolling center as an exit pupil 1.

It is preferable that, of the at least three surfaces constituting the decentered prism optical system, the first surface 3, which is disposed on the pupil side of the optical system and has both a transmitting action and a reflecting action, should be formed from a rotationally asymmetric surface or a rotationally symmetric surface, and the second surface 4, which is disposed on the side of the optical system remote from the pupil and has only a reflecting action, should be formed from a rotationally asymmetric surface.

Next, a coordinate system used in the following description will be explained.

As shown in FIG. 1, a Z-axis is defined by a straight line (which is coincident with the optical axis 2) along which an axial principal ray passing through the center of the pupil 1 of the decentered prism optical system 7 and reaching the center of the image plane 6 travels after exiting from the pupil 1 until it intersects the first surface 3 of the decentered prism optical system 7. An axis perpendicularly intersecting the Z-axis in the decentration plane of each surface constituting the decentered prism optical system 7 is defined as a Y-axis. An axis perpendicularly intersecting both the Z- and Y-axes is defined as an X-axis. The center of the pupil 1 is defined as the origin of the coordinate system. A direction in which the axial principal ray emanates from the object point to reach the image plane is defined as a positive direction of the Z-axis. A direction in which the image plane 6 lies with respect to the optical axis 2 is defined as a positive direction of the Y-axis. A direction in which the X-axis constitutes a right-handed system in combination with the Y- and Z-axes is defined as a positive direction of the X-axis.

Incidentally, it is a significant role of an ocular optical system to project an enlarged image of a first-order image formed by an objective optical system of a microscope, a telescope, binoculars, etc. However, in a decentered prism optical system, the degree of freedom for the configuration of a reflecting surface is high, and the amount of pupil aberration produced therein is larger than in an ocular optical system formed from a general refracting lens. Moreover, because the pupil aberration produced in the decentered prism optical system is rotationally asymmetric, even when the observer's iris position or eyeball rolling center is placed at the position of the exit pupil of the ocular optical system, the visual field is unfavorably vignetted in rotationally asymmetric form by the rotationally asymmetric pupil aberration. Under these circumstances, the present invention provides a decentered prism optical system which is favorably corrected for the rotationally asymmetric pupil aberration.

It is preferable to satisfy the conditions stated below. It is important to satisfy these conditions in order to effectively correct the rotationally asymmetric pupil aberration.

Although the decentered prism optical system according to the present invention is suitable for use as an ocular optical system, it will be described as an image-forming optical system on the basis of the backward ray tracing.

When X-, Y- and Z-axes are determined according to the above definition, six principal rays to ① to ⑥ among those which emanate from the center of the pupil position and are incident on the image plane are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in Table 1: an axial principal ray in the center of the image field is defined as ②; a principal ray passing at the field angle zero in the direction X and at the maximum field angle in the direction +Y is defined as ①; a principal ray passing at the field angle zero in the direction X and at the maximum field angle in the direction −Y is defined by ③; a principal ray passing at the maximum field angle in the direction X and at the maximum field angle in the direction +Y is defined as ④; a principal ray passing at the maximum field angle in the direction X and at the field angle zero in the direction Y is defined as ⑤; and a principal ray passing at the maximum field angle in the direction X and at the maximum field angle in the direction −Y is defined as ⑥. An area where the principal rays ① to ⑥ intersect each particular surface is defined as an effective area. An equation which defines the configuration of each particular surface in the effective area [i.e. an expression in which the Z-axis is expressed as an axis of the surface, or an expression in which the surface is expressed in the form of Z=f(X,Y) on the assumption that the surface is not decentered] is solved to determine each of curvatures Cy1 to Cy6 of the surface in a direction parallel to the Y-axis, which corresponds to the direction of decentration of the surface, in a plane containing a line normal to the surface at each of positions where the principal rays ① to ⑥ strike the surface. The curvature of the surface in the direction of the X-axis, which perpendicularly intersects the Y-axis, in a plane containing a line normal to the surface at each of the six positions is also determined, and the curvatures in the X-axis direction are denoted by Cx1 to Cx6, respectively.

First, conditions concerning the focal length of the second surface, which has only a reflecting action, with respect to the overall focal length of the optical system according to the present invention will be shown. The second surface in the present invention, which has only a reflecting action, is characterized in that it is decentered and has a rotationally asymmetric surface configuration having no axis of rotational symmetry in nor out of the surface. Therefore, it is meaningless to deduce the focal length from a paraxial calculation. Accordingly, the focal length is defined as follows.

Ray tracing is carried out with respect to a light ray which passes through a point that is a slight distance H (millimeter) away from the pupil center in the X-axis direction in parallel to an axial principal ray emanating from the center of the object point and passing through the center of the entrance pupil of the optical system and which enters the optical system in parallel to the axial principal ray, and a value obtained by dividing the distance H by the NA of the light ray exiting from the optical system (i.e. the value of the sine of the angle formed between the light ray and the axial principal ray) is defined as the focal length Fx (millimeter) in the direction X of the entire optical system. Further, a light ray which passes through a point that is the distance H (millimeter) away from the pupil center in the direction Y and which enters the optical system in parallel to the axial principal ray is traced, and a value obtained by dividing the distance H by the NA of the light ray exiting from the optical system (i.e. the value of the sine of the angle formed between the light ray and the axial principal ray) is defined as the focal length Fy (millimeter) in the direction Y of the entire optical system.

Assuming that Fx/Fy is FA, it is important to satisfy the following condition:

$$0.7 < FA < 1.3 \tag{A-1}$$

This condition relates to the aspect (length-to-width) ratio of the image. If FA is not larger than the lower limit of the condition (A-1), i.e. 0.7, the image decreases in size in the direction X. Consequently, when a square object is imaged, a rectangular image longer in the vertical (lengthwise) direction is undesirably formed. If FA is not smaller than the upper limit of the condition (A-1), i.e. 1.3, a square object is imaged undesirably as a rectangular image longer in the horizontal (breadthwise) direction. Further, decentration aberrations characteristic of a decentered optical system also occur in the pupil. That is, astigmatism of the pupil occurs. For example, the pupil position in the direction X and the pupil position in the direction Y undesirably differ from each other. The most desirable value of FA is 1, as a matter of course. However, in order to correct astigmatism of the pupil while correcting image distortion, it is important to make a correction with good balance within the range defined by the condition (A-1) in which FA deviates from 1 in view of the relationship to the higher-order coefficients of the surface.

It is more desirable to satisfy the following condition:

$$0.8 < FA < 1.2 \tag{A-2}$$

The refracting powers Pxn and Pyn in the directions X and Y of the second surface, which has only a reflecting action, at a position where the second surface is struck by an axial principal ray emanating from the center of the object point and passing through the center of the pupil are defined as follows:

$$Pxn = 2nCx2$$

$$Pyn = 2nCy2$$

Assuming that the refracting powers in the directions X and Y of the entire optical system, which are the reciprocals of the focal lengths Fx and Fy, are denoted by Px and Py, respectively, it is desirable to satisfy either of the following conditions (B-1) and (C-1):

$$0.8 < |PxB| < 1.6 \tag{B-1}$$

$$0.8 < |PyC| < 1.5 \tag{C-1}$$

where PxB is Pxn/Px, and PyC is Pyn/Py.

If |PxB| or |PyC| is not larger than the lower limit of these conditions, i.e. 0.8, the power in either of the directions X and Y of the reflecting surface as the second surface, which has only a reflecting action, becomes excessively smaller than the power of the entire optical system, and another surface must bear a necessary power. This is undesirable from the viewpoint of aberration correction.

If |PxB| or |PyC| is not smaller than the upper limit of the condition, i.e. 1.6 or 1.5, the power of the reflecting surface as the second surface becomes excessively strong, and it becomes impossible to correct, with good balance, pupil aberration while favorably correcting image distortion and field curvature produced by the second surface.

It is more desirable to satisfy both the conditions (B-1) and (C-1).

It is still more desirable to satisfy either of the following conditions (B-2) and (C-2):

$$1.1 < |PxB| < 1.4 \tag{B-2}$$

$$0.9 < |PyC| < 1.1 \tag{C-2}$$

The following is a description of a condition concerning the surface curvature of the second surface, which has only a reflecting action, at a position where the axial principal ray strikes the second surface. This condition is necessary to satisfy in order to minimize astigmatism produced by the second surface. Assuming that Cx2 and Cy2 are the curvatures of the second surface in the directions X and Y, respectively, and the ratio Cx2/Cy2 is denoted by CxyD, it is important to satisfy the following condition:

$$0.8 < CxyD < 1.5 \quad (D\text{-}1)$$

The second surface, which has only a reflecting action, is a decentered surface. If this surface is formed from a rotationally symmetric surface, various aberrations, including image distortion, astigmatism, coma, and astigmatism of the pupil, occur to a considerable extent, and it is impossible to favorably correct these aberrations. For this reason, it is important to form the second surface, which has only a reflecting action, from a rotationally asymmetric surface. If the second surface is formed from a rotationally symmetric surface, astigmatism produced by this surface becomes so large that it cannot be corrected by another surface. Therefore, in order to correct these aberrations, the second surface, which has only a reflecting action, is formed from a surface having only one plane of symmetry, and moreover, the above condition (D-1) is satisfied. By doing so, various aberrations are favorably corrected. Moreover, it becomes possible to obtain or observe an image free from astigmatism even on the axis. The lower limit of the condition (D-1), i.e. 0.8, and the upper limit thereof, i.e. 1.5, are limits within which astigmatism can be prevented from occurring to a considerable extent.

It is more desirable to satisfy the following condition:

$$0.95 < CxyD < 1.3 \quad (D\text{-}2)$$

It is even more desirable to satisfy the following condition:

$$1 < CxyD < 1.3 \quad (D\text{-}3)$$

Assuming that CyE denotes a value obtained by dividing the difference between the curvatures in the direction Y of the second surface at the upper and lower edges of the effective area, i.e. Cy1–Cy3, by Py, it is important to satisfy the following condition:

$$-0.2 < CyE < 0.2 \quad (E\text{-}1)$$

This condition is important to satisfy in order to reduce comatic aberration in the direction Y of the pupil and also to favorably correct vertical image distortions at the upper and lower edges of the image field. If CyE is not larger than the lower limit of the condition (E-1), i.e. −0.2, the magnification at the lower edge of the image field becomes undesirably small. If CyE is not smaller than the upper limit, i.e. 0.2, the magnification in the Y (vertical) direction at the upper edge of the image field becomes undesirably small in comparison to other portions of the image field, and the image is unfavorably distorted. In particular, in a decentered prism optical system wherein a first surface having both reflecting and transmitting actions is formed from a rotationally symmetric surface to improve the productivity of the decentered prism as in the present invention, it is necessary, in order to correct the image distortion by another surface, to use the third surface, which is the closest to the image in the optical system and has only a transmitting action; otherwise, the image distortion cannot basically be corrected. However, the third surface, which has only a transmitting action, mainly corrects field curvature. Therefore, if the second surface, which has only a reflecting action, does not satisfy the condition (E-1), it will become impossible for the entire optical system to correct field curvature and image distortion simultaneously.

It is more desirable from the viewpoint of aberration correction to satisfy the following condition:

$$-0.1 < CyE < 0.1 \quad (E\text{-}2)$$

It is still more desirable from the viewpoint of aberration correction to satisfy the following condition:

$$-0.05 < CyE < 0.05 \quad (E\text{-}3)$$

It is still more desirable from the viewpoint of aberration correction to satisfy the following condition:

$$-0.02 < CyE < 0.01 \quad (E\text{-}4)$$

Assuming that CxF denotes a value obtained by dividing the difference between the curvatures in the direction X of the second surface at the upper and lower edges of the effective area, i.e. Cx1–Cx3, by Px, it is important to satisfy the following condition:

$$-0.2 < CxF < 0.2 \quad (F\text{-}1)$$

This condition is important in order to correct comatic aberration in the direction X of the pupil and also necessary to satisfy in order to favorably correct horizontal image distortions at the upper and lower edges of the image field. If CxF is not larger than the lower limit of the condition (F-1), i.e. −0.2, the magnification at the lower edge of the image field becomes undesirably small. If CxF is not smaller than the upper limit, i.e. 0.2, the magnification in the X (horizontal) direction at the upper edge of the image field becomes undesirably small in comparison to other portions of the image field, and the image is unfavorably distorted in a trapezoidal shape.

It is more desirable from the viewpoint of aberration correction to satisfy the following condition:

$$-0.1 < CxF < 0.1 \quad (F\text{-}2)$$

It is still more desirable from the viewpoint of aberration correction to satisfy the following condition:

$$-0.05 < CxF < 0.05 \quad (F\text{-}3)$$

It is still more desirable from the viewpoint of aberration correction to satisfy the following condition:

$$-0.03 < CxF < -0.05 \quad (F\text{-}4)$$

The following is a description of an image distortion in which a straight line displayed in the center of the image display area appears to be vertically curved in a bow shape. The following conditions relate to a bow-shaped rotationally asymmetric image distortion in which a horizontal line, for example, is undesirably curved in a bow shape when imaged.

Assuming that, as shown in the perspective view of FIG. 21(a) and FIG. 21(b), which is a projection of FIG. 21(a) onto the YZ-plane, DY denotes the angle formed in the YZ-plane between a line n' normal to a rotationally asymmetric surface A at a point where a principal ray at the maximum field angle in the direction X intersects the rotationally asymmetric surface A and a line n normal to the rotationally asymmetric surface A at a point where the axial principal ray intersects the rotationally asymmetric surface A, it is important to satisfy the following condition:

$$0 \leq |DY| < 1 \text{ (°)} \quad \text{(G-1)}$$

If |DY| is smaller than the lower limit of the condition (G-1), i.e. 0, it becomes impossible to correct the bow-shaped image distortion. If |DY| is not smaller than the upper limit, i.e. 1, the bow-shaped image distortion is over-corrected. In either case, the image is distorted in a bow shape.

It is more desirable to satisfy the following condition:

$$0 \leq |DY| < 0.3 \text{ (°)} \quad \text{(G-2)}$$

It is still more desirable to satisfy the following condition:

$$0 \leq |DY| < 0.2 \text{ (°)} \quad \text{(G-3)}$$

It is still more desirable to satisfy the following condition:

$$0 \leq |DY| < 0.05 \text{ (°)} \quad \text{(G-4)}$$

Assuming that CyH denotes a value obtained by dividing the difference between the curvatures in the direction Y of the first surface, which has both transmitting and reflecting actions, at the upper and lower edges of the effective area, i.e. Cy1–Cy3, by Py, it is important to satisfy the following condition:

$$-0.2 < CyH < 0.2 \quad \text{(H-1)}$$

This condition is important to satisfy in order to favorably correct vertical image distortions at the upper and lower edges of the image field and to correct pupil aberration. If CyH is not larger than the lower limit, i.e. −0.2, or not smaller than the upper limit, i.e. 0.2, image distortion occurs to a considerable extent in the Y (vertical) direction of the image field, and comatic aberration of the pupil becomes unfavorably large and hence impossible to correct at the same time as the image distortion is corrected by the second and third surfaces.

It is more desirable from the viewpoint of aberration correction to satisfy the following condition:

$$-0.1 < CyH < 0.1 \quad \text{(H-2)}$$

It is still more desirable from the viewpoint of aberration correction to satisfy the following condition:

$$-0.05 < CyH < 0.05 \quad \text{(H-3)}$$

Assuming that CxI denotes a value obtained by dividing the difference between the curvatures in the direction X of the first surface, which has both transmitting and reflecting actions, at the upper and lower edges of the effective area, i.e. Cx1–Cx3, by Px, it is important to satisfy the following condition:

$$-0.2 < CxI < 0.2 \quad \text{(I-1)}$$

This condition is important to satisfy in order to favorably correct vertical image distortions at the upper and lower edges of the image field and to correct pupil aberration. If CxI is not larger than the lower limit, i.e. −0.2, or not smaller than the upper limit, i.e. 0.2, image distortion occurs to a considerable extent in the Y (vertical) direction of the image field, and comatic aberration of the pupil becomes unfavorably large and hence impossible to correct at the same time as the image distortion is corrected by the second and third surfaces.

It is more desirable from the viewpoint of aberration correction to satisfy the following condition:

$$-0.1 < CxI < 0.1 \quad \text{(I-2)}$$

It is still more desirable from the viewpoint of aberration correction to satisfy the following condition:

$$-0.1 < CxI < 0 \quad \text{(I-3)}$$

Regarding the above conditions (A-1) to (I-3), it is preferable that the first surface, which has both reflecting and transmitting actions, should be formed from a rotationally symmetric surface, and the second surface, which has only a reflecting action, should be formed from a plane-symmetry free-form surface which has no axis of rotational symmetry in nor out of the surface and which has only one plane of symmetry. The present invention is applicable not only to an arrangement in which the second surface is formed from such a plane-symmetry free-form surface, but also to an arrangement in which the second surface is formed from an anamorphic surface having no axis of rotational symmetry in nor out of the surface, i.e. a rotationally asymmetric surface configuration having no axis of rotational symmetry in nor out of the surface.

It is preferable that the pupil aberration in the decentered prism optical system according to the present invention should be not more than 4 millimeters in terms of transverse aberration. The numerical value is equivalent to the amount of transverse aberration at the position of the exit pupil in the forward ray tracing of an ocular optical system, which corresponds to the observer's iris position or eyeball rolling center. In other words, in the case of the backward ray tracing as in the present invention, a value obtained by dividing the amount of transverse aberration at the exit pupil position in the backward ray tracing of the ocular optical system by the projection magnification of the pupil is the amount of transverse aberration at the exit pupil position in the forward ray tracing. It is important for this value to satisfy the above-described condition. If the pupil aberration exceeds the condition, because the diameter of the human pupil is generally about 4 millimeters, there are light rays which do not enter the pupil of the observer's eyeball, and thus the visual field is vignetted.

It is even more desirable that the amount of transverse aberration should be not more than 2 millimeters.

In general, it is difficult to produce a decentered prism optical system by polishing, and it is common practice to form constituent surfaces by grinding one by one or by injection molding of a plastic material or molding of a glass material. At this time, it is necessary to check to see whether or not each surface of the decentered prism optical system has been produced with a predetermined configuration. A three-dimensional coordinate measuring device is generally used to measure such a three-dimensional rotationally asymmetric surface configuration. However, it takes a great deal of time to measure with a three-dimensional coordinate measuring device. Therefore, such a measuring method is impractical. It is important in the present invention that at least one of the at least three surfaces constituting the decentered prism optical system should be formed from a rotationally symmetric surface.

It is more desirable to use a rotationally symmetric surface for the first surface, which is disposed on a side of the decentered prism optical system closer to the pupil and has both transmitting and internally reflecting actions and which further has the widest effective area in the optical system and suffers relatively large aberrational deterioration. By doing so, it is possible to construct a decentered prism optical system that enables the finished condition of a surface configuration to be readily evaluated in a short period of time. The first surface, which is closer to the pupil and has both reflecting and transmitting actions, has a large effective surface area. Therefore, it is convenient if the first surface is used as a reference for judgment as to whether the whole optical system is distorted or not. In injection molding of a plastic material, it is particularly important to minimize a change in the overall configuration of the optical system, and it is an effective way in mass-production to estimate the overall configuration of the optical system by measuring a surface having a large effective surface.

It is preferable that, of the at least three surfaces constituting the decentered prism optical system, the first surface, which is disposed on the pupil side of the optical system and has both a transmitting action and a reflecting action, should be formed from a rotationally symmetric surface, and the second surface, which is disposed on the side of the decentered prism remote from the pupil and has only a reflecting action, should be formed from a rotationally asymmetric surface. The reason for this is as follows: Assuming that a light ray emanating from the center of the object and passing through the center of the pupil to reach the center of the image plane is an axial principal ray, a point at which the axial principal ray is reflected by the first surface, which has both transmitting and reflecting actions, has a weaker refracting power than that of a point at which the axial principal ray is reflected by the second surface, which has only a reflecting action. Therefore, the amount of decentration aberration produced by the first surface owing to the decentration thereof is basically small, so that even if this surface is formed from a rotationally symmetric surface, the decentration aberrations can be corrected by another surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
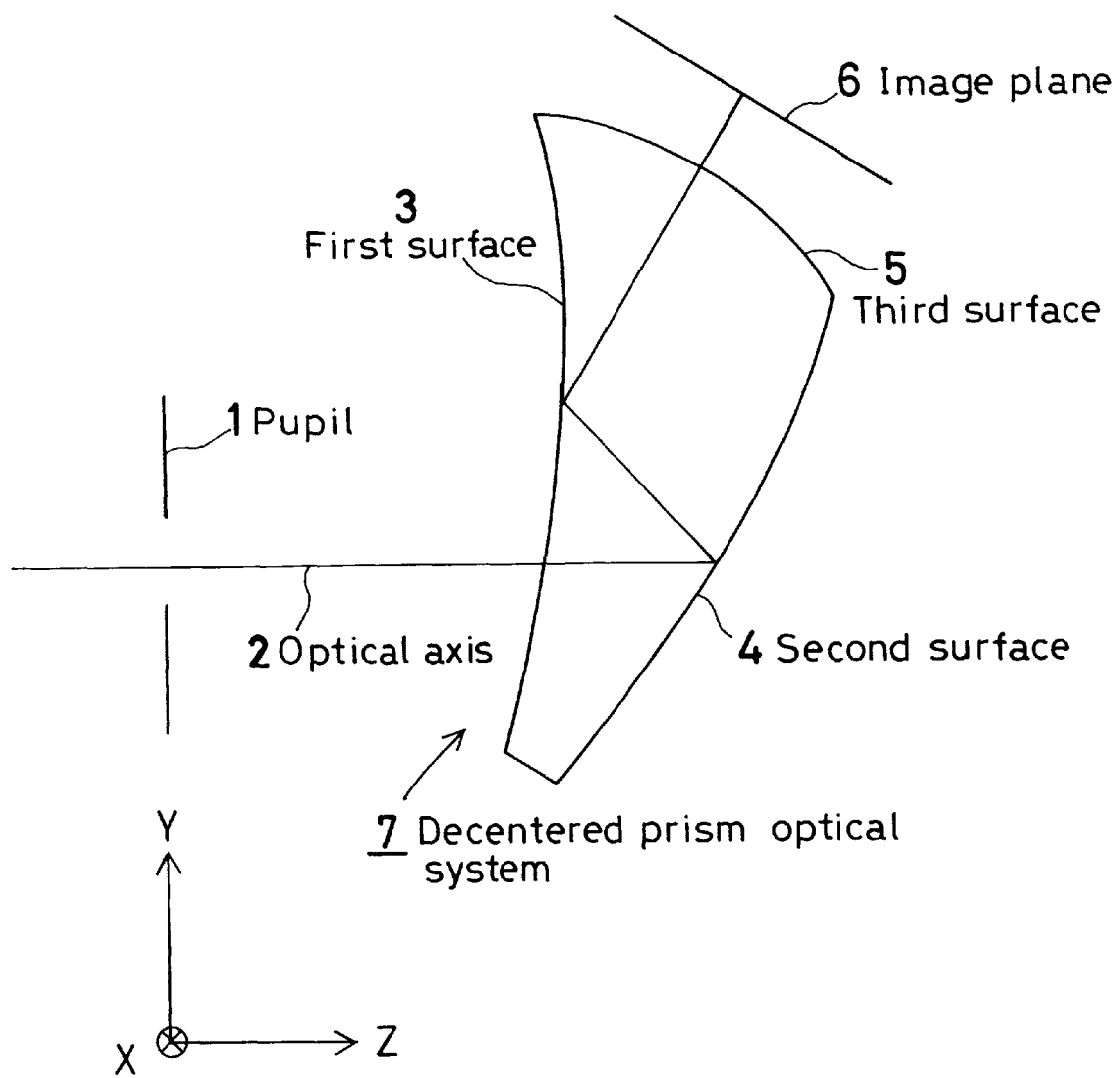
FIG. 1 is a ray path diagram illustrating the decentered prism optical system according to the present invention as arranged in the form of a three-surface prism.
Figure 2:
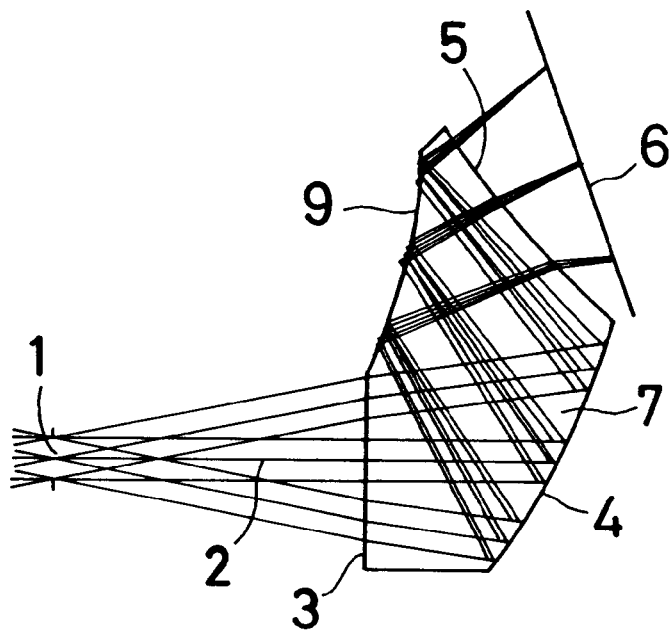
FIG. 2 is a ray path diagram illustrating another arrangement of the decentered prism optical system according to the present invention.
Figure 3:
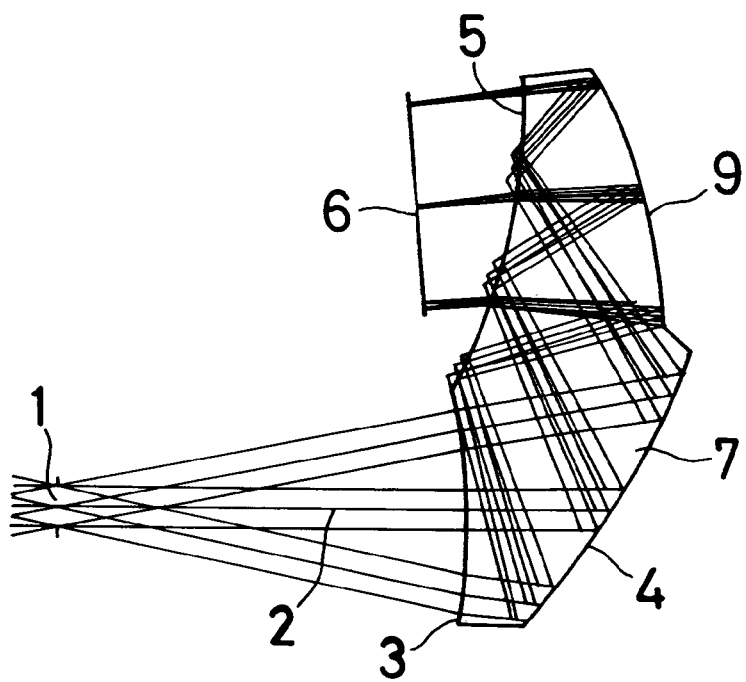
FIG. 3 is a ray path diagram illustrating another arrangement of the decentered prism optical system according to the present invention.
Figure 4:
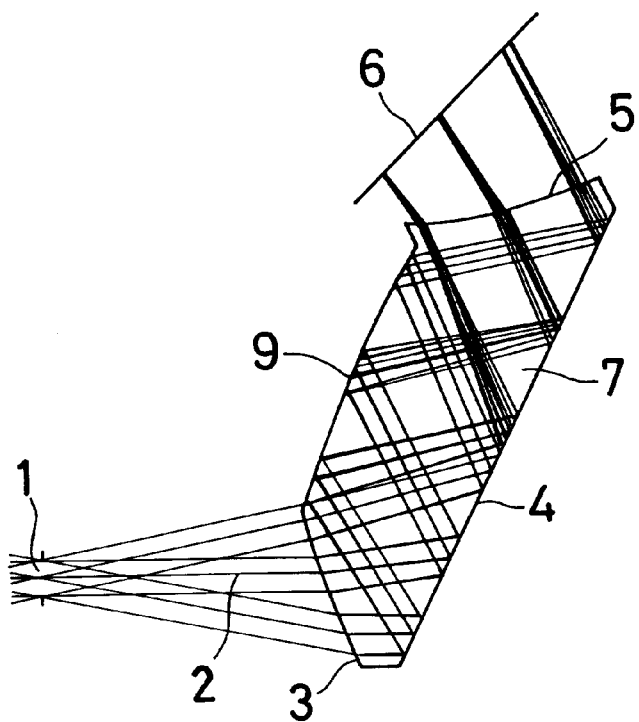
FIG. 4 is a ray path diagram Illustrating another arrangement of the decentered prism optical system according to the present invention.
Figure 5:
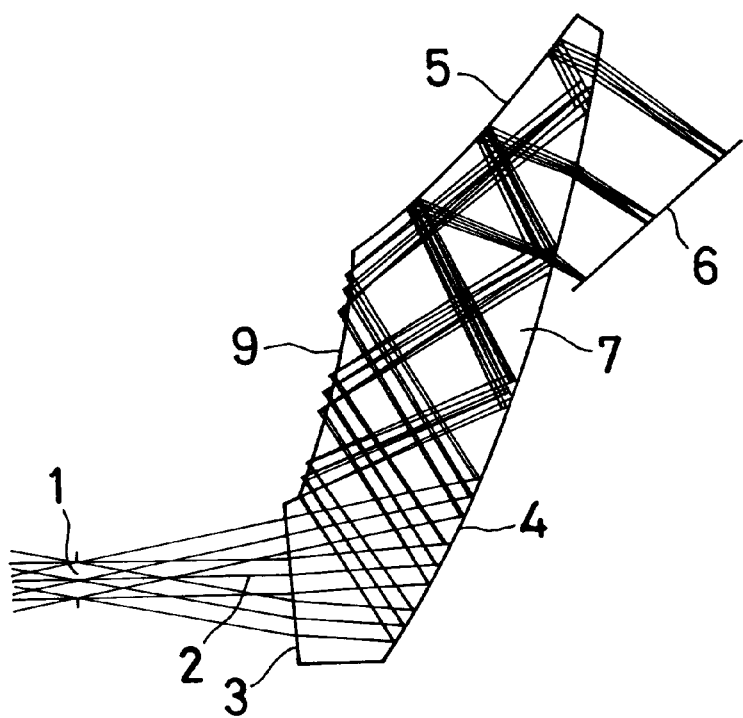
FIG. 5 is a ray path diagram illustrating another arrangement of the decentered prism optical system according to the present invention.
Figure 6:
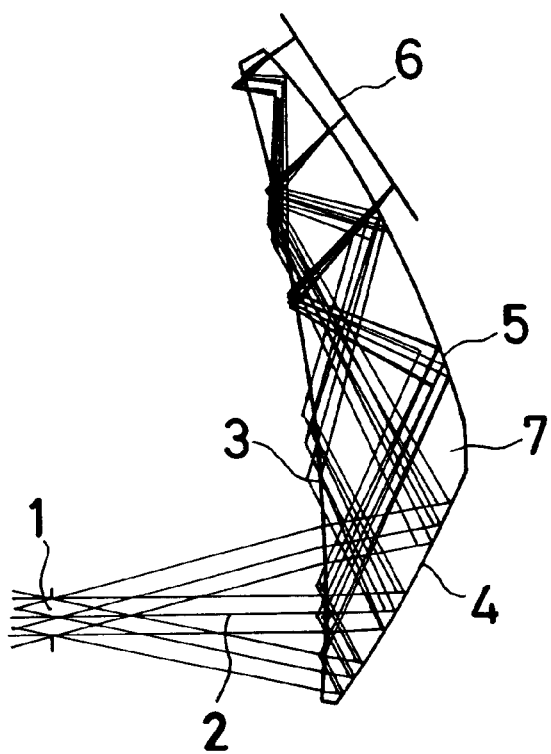
FIG. 6 is a ray path diagram illustrating another arrangement of the decentered prism optical system according to the present invention.
Figure 7:
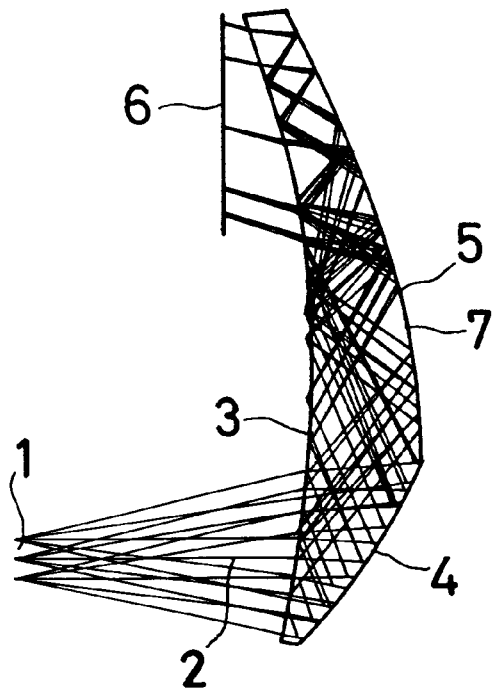
FIG. 7 is a ray path diagram illustrating another arrangement of the decentered prism optical system according to the present invention.

Examples 1 to 3 of the decentered prism optical system according to the present invention will be described below. In constituent parameters of each example (described later), as shown in FIG. 1, the center of a pupil 1 of an optical system 7 is defined as the origin of the optical system. An optical axis 2 is defined by a light ray which emanates from the center of an object and passes through the center (origin) of the pupil 1. A Z-axis is taken in a direction in which light rays travel from the pupil 1 along the optical axis 2. A Y-axis is taken in a direction which extends through the center of the pupil 1 at right angles to the Z-axis in a plane in which light rays are bent by the optical system 7. An X-axis is taken in a direction which extends through the center of the pupil 1 at right angles to both the Y- and Z-axes. A direction in which the Z-axis extends from the pupil 1 toward the optical system 7 is defined as a positive direction of the Z-axis. A direction in which the Y-axis extends from the optical axis 2 toward an image plane 6 is defined as a positive direction of the Y-axis. A direction in which the X-axis constitutes a right-handed system in combination with the Y- and Z-axes is defined as a positive direction of the X-axis. It should be noted that ray tracing is carried out in a direction in which light rays enter the optical system 7 from the object side of the pupil 1 of the optical system 7.

Regarding decentered surfaces, each surface is given displacements in the X-, Y- and Z-axis directions of the vertex position of the surface from the center of the pupil 1, which is the origin of the optical system 7, and tilt angles of the center axis of the surface [the Z-axis of Eq.(a) shown below in the case of a free-form surface] with respect to the X-, Y- and Z-axes [i.e. tilt angles $\alpha$, $\beta$, and $\gamma$ (°), respectively]. In this case, positive $\alpha$ and $\beta$ mean counter-clockwise rotation relative to the positive directions of the corresponding axes, and positive $\gamma$ means clockwise rotation relative to the positive direction of the Z-axis. In addition, the radius of curvature of each spherical surface, surface separation, refractive index of each medium, and Abbe's number are given according to the conventional method.

The configuration of a rotationally asymmetric surface is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a rotationally asymmetric surface having only one plane of symmetry) is defined by the equation expressing a rotationally asymmetric surface, when symmetry produced by the plane of symmetry is to be obtained in the direction X, all terms with odd-numbered powers of X are made zero (for example, the coefficients of the terms with odd-numbered powers of X are set equal to zero). To obtain symmetry produced by the plane of symmetry in the direction Y, all terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the direction X is expressed by an expanded form of the above equation as follows:

$$Z = C_2 + C_3 Y + C_4 X + C_5 Y^2 + C_6 YX + C_7 X^2 + C_8 Y^3 + C_9 Y^2 X + \quad (a)$$
$$C_{10} YX^2 + C_{11} X^3 + C_{12} Y^4 + C_{13} Y^3 X + C_{14} Y^2 X^2 + C_{15} YX^3 +$$
$$C_{16} X^4 + C_{17} Y^5 + C_{18} Y^4 X + C_{19} Y^3 X^2 + C_{20} Y^2 X^3 + C_{21} YX^4 +$$
$$C_{22} X^5 + C_{23} Y^6 + C_{24} Y^5 X + C_{25} Y^4 X^2 + C_{26} Y^3 X^3 +$$
$$C_{27} Y^2 X^4 + C_{28} YX^5 + C_{29} X^6 + C_{30} Y^7 + C_{31} Y^6 X + C_{32} Y^5 X^2 +$$
$$C_{33} Y^4 X^3 + C_{34} Y^3 X^4 + C_{35} Y^2 X^5 + C_{36} YX^6 + C_{37} X^7$$

In the above defining Eq.(a), the coefficients $C_4$, $C_6$, $C_9$, ... of the terms with odd-numbered powers of X are set equal to zero (see Examples described later). It should be noted that coefficients concerning aspherical surfaces which are not shown in the constituent parameters (shown later) are zero.

Plane-symmetry free-form surfaces may also be defined by Zernike polynomials. That is, the configuration of a plane-symmetry free-form surface may be defined by the following Eq.(b). The Z-axis of the defining Eq.(b) is the axis of Zernike polynomial.

$$X = R \times \cos(A) \quad (b)$$
$$Y = R \times \sin(A)$$
$$Z = D_2 + D_3 R\cos(A) + D_4 R\sin(A) + D_5 R^2 \cos(2A) + D_6(R^2 - 1) +$$
$$D_7 R^2 \sin(2A) + D_8 R^3 \cos(3A) + D_9(3R^3 - 2R)\cos(A) +$$
$$D_{10}(3R^3 - 2R)\sin(A) + D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A)$$

It should be noted that the plane-symmetry free-form surface in the above equation is expressed as a surface which is symmetric with respect to the direction X. In the above equation, $D_m$ (m is an integer of 2 or higher) are coefficients.

As an example of other expressions of surfaces usable in the present invention, the above defining equation ($Z = \Sigma_n \Sigma_m C_{nm} X^n Y^{n-m}$) may be expanded to express a surface which is symmetric with respect to the direction X and in which k=7, as shown by the following Eq.(c) as in the case of Eq.(a):

$$Z = C_2 + C_3 Y + C_4 |X| + C_5 Y^2 + C_6 Y|X| + C_7 X^2 + C_8 Y^3 + C_9 Y^2 |X| + \quad (c)$$
$$C_{10} YX^2 + C_{11} |X^3| + C_{12} Y^4 + C_{13} Y^3 |X| + C_{14} Y^2 X^2 + C_{15} Y|X^3| +$$
$$C_{16} X^4 + C_{17} Y^5 + C_{18} Y^4 |X| + C_{19} Y^3 X^2 + C_{20} Y^2 |X^3| + C_{21} YX^4 +$$
$$C_{22} |X^5| + C_{23} Y^6 + C_{24} Y^5 |X| + C_{25} Y^4 X^2 + C_{26} Y^3 |X^3| +$$
$$C_{27} Y^2 X^4 + C_{28} Y|X^5| + C_{29} X^6 + C_{30} Y^7 + C_{31} Y^6 |X| + C_{32} Y^5 X^2 +$$
$$C_{33} Y^4 |X^3| + C_{34} Y^3 X^4 + C_{35} Y^2 |X^5| + C_{36} YX^6 + C_{37} |X^7|$$

The configuration of an anamorphic surface usable in the present invention is defined by the following equation. A straight line which passes through the origin of the surface configuration and which is perpendicular to the optical surface is defined as the axis of the anamorphic surface.

$$Z = (Cx \cdot X^2 + Cy \cdot Y^2) / [1 + \{1 - (1+Kx)Cx^2 \cdot X^2 - (1+Ky)Cy^2 \cdot Y^2\}^{1/2}] + \Sigma Rn\{(1-Pn)X^2 + (1+Pn)Y^2\}^{(n+1)}$$

Assuming that n=4 (polynomial of degree 4), for example, the equation, when expanded, may be given by:

$$Z = (Cx \cdot X^2 + Cy \cdot Y^2) / \qquad (d)$$
$$[1 + \{1 - (1 + Kx)Cx^2 \cdot X^2 - (1 + Ky)Cy^2 \cdot Y^2\}^{1/2}] +$$
$$R1\{(1 - P1)X^2 + (1 + P1)Y^2\}^2 +$$
$$R2\{(1 - P2)X^2 + (1 + P2)Y^2\}^3 +$$
$$R3\{(1 - P3)X^2 + (1 + P3)Y^2\}^4 + R4\{(1 - P4)X^2 + (1 + P4)Y^2\}^5$$

where Z is the amount of deviation from a plane tangent to the origin of the surface configuration; Cx is the curvature in the X-axis direction; Cy is the curvature in the Y-axis direction; Kx is the conical coefficient in the X-axis direction; Ky is the conical coefficient in the Y-axis direction; Rn is the rotationally symmetric component of the aspherical surface term; and Pn is the rotationally asymmetric component of the aspherical surface term. It should be noted that the radius of curvature Rx in the X-axis direction and the radius of curvature Ry in the Y-axis direction are related to the curvatures Cx and Cy as follows:

$$Rx = 1/Cx, \; Ry = 1/Cy$$

The configuration of a rotationally symmetric aspherical surface is defined by the following equation. The Z-axis of the defining equation is the axis of the rotationally symmetric aspherical surface.

$$Z = (Y^2/R) / [1 + \{1 - P(Y^2/R^2)\}^{1/2}] + A_4 Y^4 + A_6 Y^6 + A_8 Y^8 + A_{10} Y^{10} \qquad (e)$$

where Y is a direction perpendicular to Z; R is a paraxial curvature radius; P is a conical coefficient; and $A_4$, $A_6$, $A_8$, and $A_{10}$ are aspherical coefficients, respectively.

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

Figure 8:
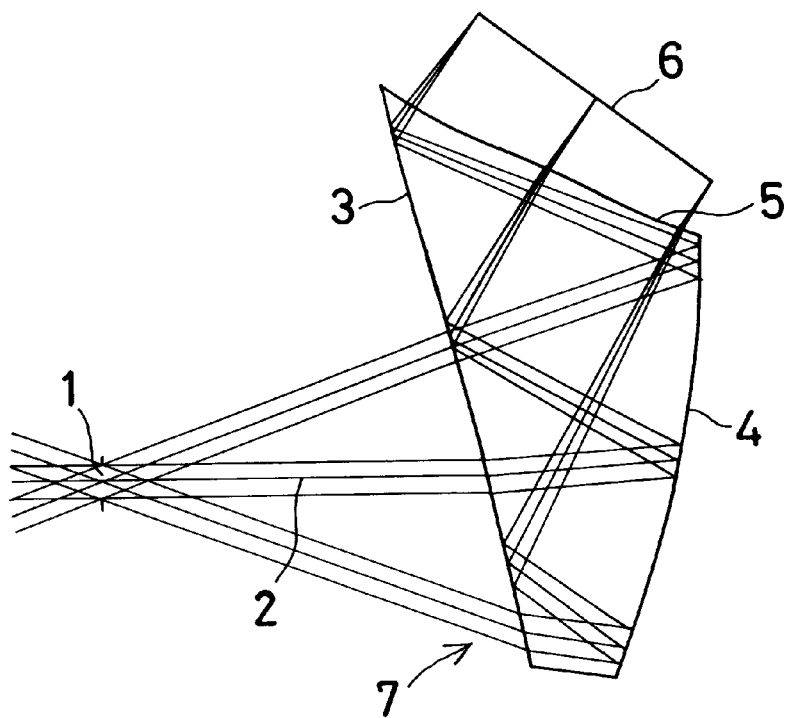
FIG. 8 is a sectional view of a decentered prism optical system according to Example 1 of the present invention.
Figure 9:
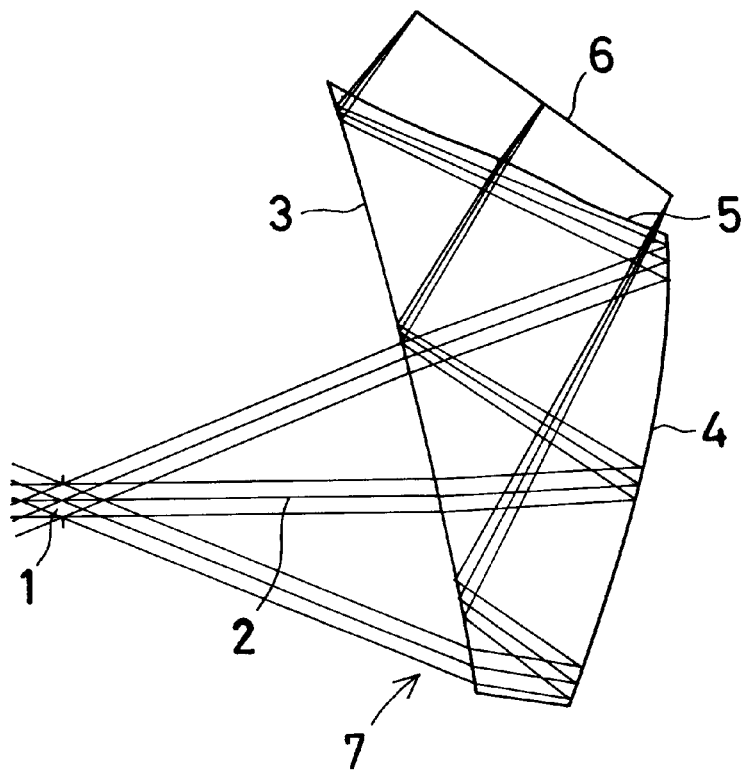
FIG. 9 is a sectional view of a decentered prism optical system according to Example 2 of the present invention.
Figure 10:
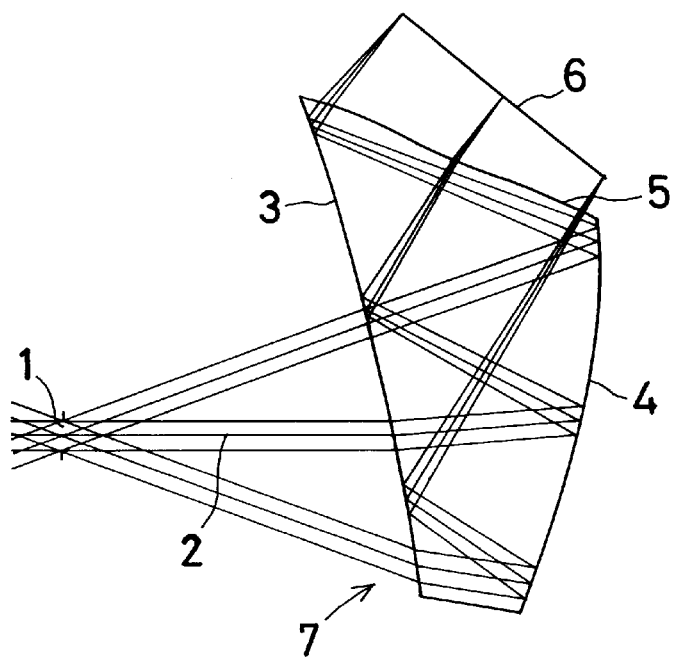
FIG. 10 is a sectional view of a decentered prism optical system according to Example 3 of the present invention.

FIGS. 8 to 10 are sectional views of Examples 1 to 3, taken along the YZ-plane containing the optical axis 2 of the decentered prism optical system 7. The decentered prism 7 according to any of Examples 1 to 3 has three surfaces 3, 4 and 5 as in the case of FIG. 1. The space between the three surfaces 3 to 5 is filled with a transparent medium having a refractive index larger than 1.3. In the backward ray tracing, a bundle of light rays from an object (not shown) first passes through the pupil 1 of the optical system 7 along the optical axis 2 and enters the optical system 7 through the first surface 3, which has both transmitting and reflecting actions. The incident light rays are reflected toward the pupil 1 by the second surface 4, which is a reflecting surface disposed on a side of the optical system 7 remote from the pupil 1 and has only a reflecting action. The reflected rays are reflected by the first surface 3 so as to travel away from the pupil 1. The reflected rays pass through the third surface 5, which has only a transmitting action, and reach the image plane 6 where the rays form an image. In Examples 1 and 2, all the three surfaces 3, 4 and are plane-symmetry free-form surfaces defined by Eq.(b). In Example 3, the first surface 3 is a rotationally symmetric aspherical surface defined by Eq.(e), which is decentered and has a concave surface directed toward the pupil 1. The second and third surfaces 4 and 5 are plane-symmetry free-form surfaces defined by Eq.(b).

Figure 11:
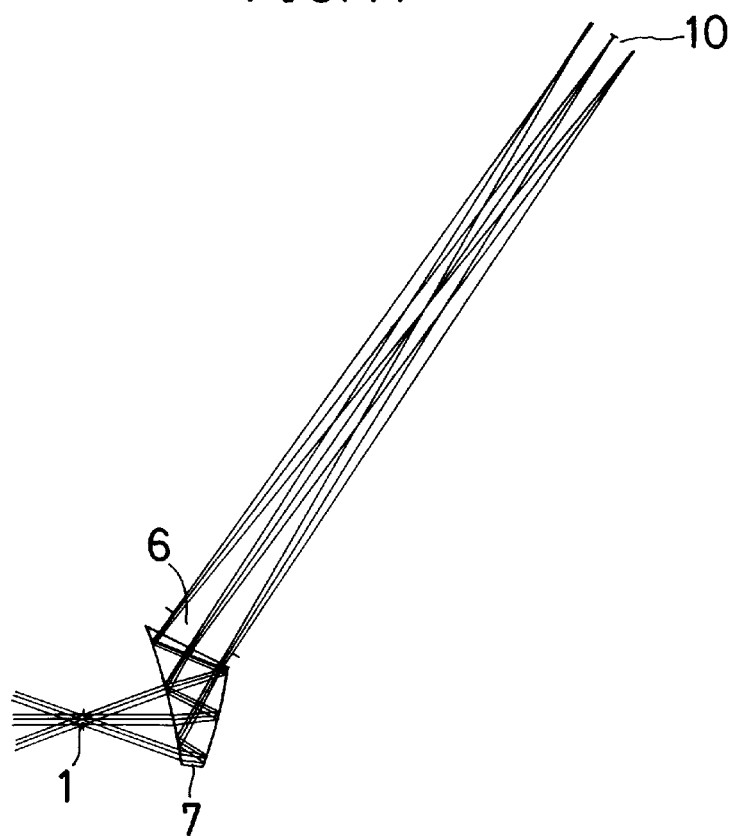
FIG. 11 is a ray path diagram illustrating pupil tracing in Example 1 of the present invention.
Figure 12:
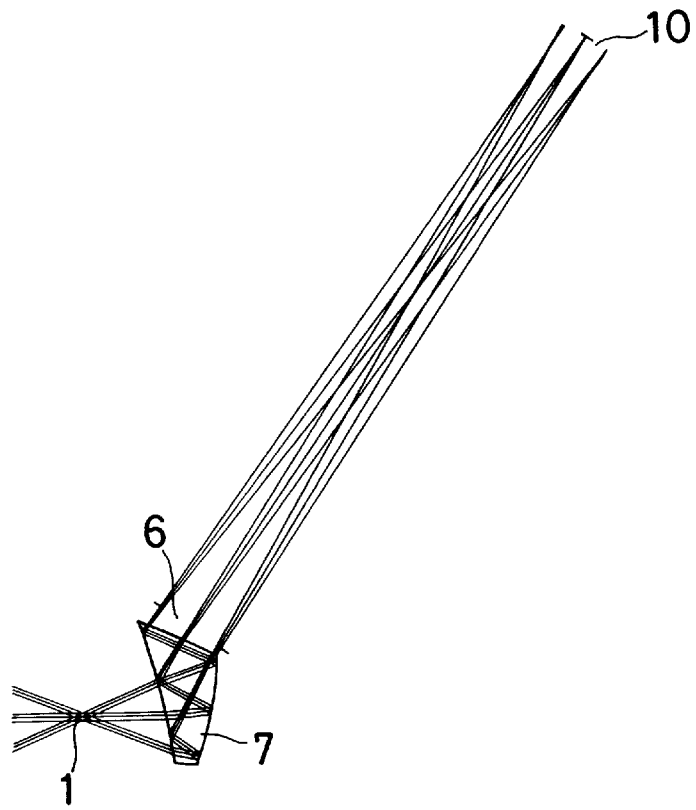
FIG. 12 is a ray path diagram illustrating pupil tracing in Example 2 of the present invention.
Figure 13:
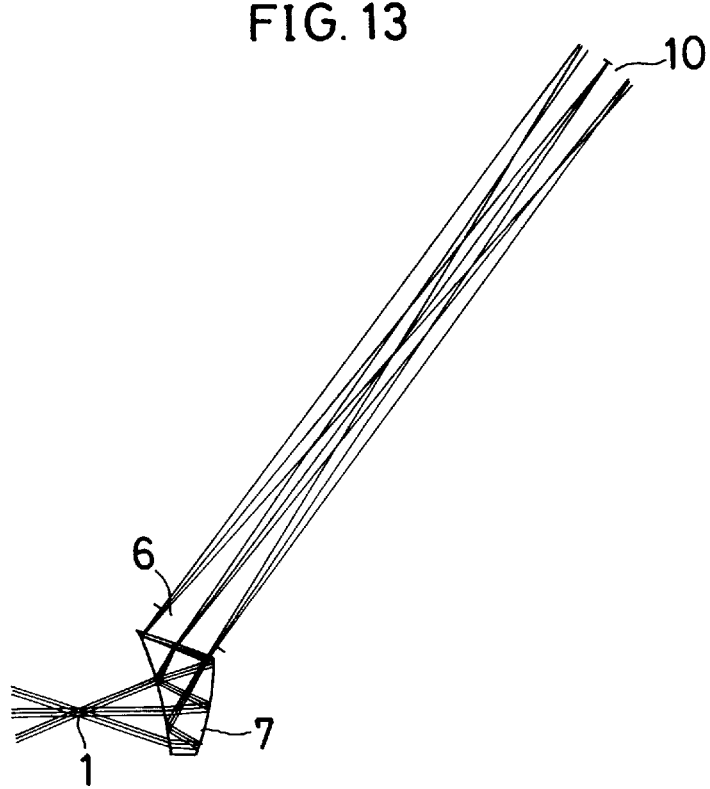
FIG. 13 is a ray path diagram illustrating pupil tracing in Example 3 of the present invention.

In actuality, as shown in FIGS. 11 to 13 which are ray path diagrams illustrating pupil tracing of the decentered prism optical systems 7 according to Examples 1 to 3 when used as ocular optical systems, a first-order image produced by an objective optical system (not shown) is formed on the image plane 6, and light rays from the first-order image travel along an optical path which is reverse to the above-described optical path and are projected into an observer's eyeball with the observer's iris position or eyeball rolling center as an exit pupil 1. In addition, the exit pupil 10 of the objective lens is formed at the position of the exit pupil 1 by the decentered prism optical system 7.

In Examples 1 and 3, the image height ø is 18 millimeters. In Example 2, the image height ø is 20 millimeters. In each Example, the focal length is 25 millimeters, which is equivalent to that of a rotationally symmetric refracting ocular optical system with a magnifying power of 10. In each Example, the pupil diameter is 4 millimeters, and in the backward ray tracing, the position of the virtual image at −1 meter is defined as an object point. The projection magnification of the pupil is 7.7 in Example 1, 7.45 in Example 2, and 7.25 in Example 3.

Constituent parameters in the foregoing Examples 1 to 3 are shown below. It should be noted that each free-form surface is denoted by "FFS".

EXAMPLE 1

| Surface No. | Radius of curvature | Surface separation | Displacement and tilt | Refractive index | Abbe's No. |
|---|---|---|---|---|---|
| Object plane | ∞ | −1000.0000 | | | |
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[3] | | (3) | | |
| 6 | ∞ | 200.00 | (4) | | |
| 7 | ∞ | −200.00 | | (Exit pupil) | |
| Image plane | ∞ | | | | |

FFS[1]

| $C_5$ | $-7.0761 \times 10^{-4}$ | $C_7$ | $-3.5979 \times 10^{-3}$ | $C_{10}$ | $-2.8418 \times 10^{-5}$ |
| $C_{12}$ | $-2.2489 \times 10^{-8}$ | $C_{14}$ | $-2.0316 \times 10^{-7}$ | $C_{16}$ | $2.7999 \times 10^{-8}$ |

FFS[2]

| $C_5$ | $-6.6776 \times 10^{-3}$ | $C_7$ | $-8.2738 \times 10^{-3}$ | $C_{10}$ | $5.3491 \times 10^{-6}$ |
| $C_{12}$ | $-6.9758 \times 10^{-7}$ | $C_{14}$ | $-1.8962 \times 10^{-6}$ | $C_{16}$ | $-5.7639 \times 10^{-7}$ |

FFS[3]

| $C_5$ | $-3.7583 \times 10^{-3}$ | $C_7$ | $-9.4815 \times 10^{-3}$ | $C_{10}$ | $-1.9353 \times 10^{-4}$ |
| $C_{12}$ | $5.2668 \times 10^{-5}$ | $C_{14}$ | $1.0719 \times 10^{-4}$ | $C_{16}$ | $6.3664 \times 10^{-5}$ |

Displacement and tilt(1)

| x | 0.000 | y | 8.903 | z | 22.479 |
| α | 14.70 | β | 0.00 | γ | 0.00 |

Displacement and tilt(2)

| x | 0.000 | y | 0.992 | z | 36.942 |
| α | −12.01 | β | 0.00 | γ | 0.00 |

Displacement and tilt(3)

| x | 0.000 | y | 19.197 | z | 28.893 |
| α | 65.27 | β | 0.00 | γ | 0.00 |

Displacement and tilt(4)

| x | 0.000 | y | 23.592 | z | 32.027 |
| α | 54.44 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.0000 | | | |
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[3] | | (3) | | |
| 6 | ∞ | 200.00 | (4) | | |
| 7 | ∞ | −200.00 | | (Exit pupil) | |
| Image plane | ∞ | | | | |

FFS[1]

| $C_5$ | $-7.0761 \times 10^{-4}$ | $C_7$ | $-3.5979 \times 10^{-3}$ | $C_{10}$ | $-2.8418 \times 10^{-5}$ |
| $C_{12}$ | $-2.2489 \times 10^{-8}$ | $C_{14}$ | $-2.0316 \times 10^{-7}$ | $C_{16}$ | $2.7999 \times 10^{-6}$ |

FFS[2]

| $C_5$ | $-6.6776 \times 10^{-3}$ | $C_7$ | $-8.2738 \times 10^{-3}$ | $C_{10}$ | $5.3491 \times 10^{-6}$ |
| $C_{12}$ | $-6.9758 \times 10^{-7}$ | $C_{14}$ | $-1.8962 \times 10^{-6}$ | $C_{16}$ | $-5.7639 \times 10^{-7}$ |

FFS[3]

| $C_3$ | $-3.7583 \times 10^{-3}$ | $C_7$ | $-9.4815 \times 10^{-3}$ | $C_{10}$ | $-1.9353 \times 10^{-4}$ |
| $C_{12}$ | $5.2668 \times 10^{-5}$ | $C_{14}$ | $1.0719 \times 10^{-4}$ | $C_{16}$ | $6.3664 \times 10^{-5}$ |

Displacement and tilt(1)

| x | 0.000 | y | 8.903 | z | 22.479 |
| α | 14.70 | β | 0.00 | γ | 0.00 |

Displacement and tilt(2)

| x | 0.000 | y | 0.992 | z | 36.942 |
| α | −12.01 | β | 0.00 | γ | 0.00 |

Displacement and tilt(3)

| x | 0.000 | y | 19.197 | z | 28.893 |
| α | 65.27 | β | 0.00 | γ | 0.00 |

Displacement and tilt(4)

| x | 0.000 | y | 23.592 | z | 32.027 |
| α | 54.44 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.0000 | | | |
| 1 | ∞(Pupil) | | | | |
| 2 | −130.063 P 1 $A_4$ $0.7921 \times 10^{-5}$ $A_6$ $-0.1483 \times 10^{-7}$ $A_8$ $0.1334 \times 10^{-10}$ | | (1) | 1.4922 | 57.5 |
| 3 | FFS[1] | | (2) | 1.4922 | 57.5 |
| 4 | −130.063 P 1 $A_4$ $0.7921 \times 10^{-5}$ $A_6$ $-0.1483 \times 10^{-7}$ $A_8$ $0.1334 \times 10^{-10}$ | | (1) | 1.4922 | 57.5 |
| 5 | FFS[2] | | (3) | | |
| 6 | ∞ | 200.00 | (4) | | |
| 7 | ∞ | −200.00 | | (Exit pupil) | |
| Image plane | ∞ | | | | |

-continued

| Surface No. | Radius of curvature | Surface separation | Displacement and tilt | Refractive index | Abbe's No. |
|---|---|---|---|---|---|

FFS[1]

| $C_5$ | $-7.8521 \times 10^{-3}$ | $C_7$ | $-8.2972 \times 10^{-3}$ | $C_{10}$ | $-1.4022 \times 10^{-5}$ |
| $C_{12}$ | $1.3750 \times 10^{-6}$ | $C_{14}$ | $6.0967 \times 10^{-6}$ | $C_{16}$ | $6.5558 \times 10^{-7}$ |
| $C_{19}$ | $4.7998 \times 10^{-7}$ | $C_{21}$ | $-1.1430 \times 10^{-7}$ | $C_{25}$ | $1.8645 \times 10^{-8}$ |
| $C_{27}$ | $-1.9169 \times 10^{-8}$ | $C_{32}$ | $-2.0383 \times 10^{-9}$ | $C_{34}$ | $-1.1062 \times 10^{-9}$ |
| $C_{36}$ | $8.0948 \times 10^{-10}$ | | | | |

FFS[2]

| $C_5$ | $5.4375 \times 10^{-3}$ | $C_7$ | $1.6026 \times 10^{-2}$ | $C_{10}$ | $-2.2446 \times 10^{-3}$ |
| $C_{12}$ | $-5.1302 \times 10^{-5}$ | $C_{14}$ | $-9.6684 \times 10^{-4}$ | $C_{16}$ | $-9.6401 \times 10^{-5}$ |
| $C_{19}$ | $3.1505 \times 10^{-5}$ | $C_{21}$ | $6.4051 \times 10^{-5}$ | $C_{25}$ | $5.8820 \times 10^{-6}$ |
| $C_{27}$ | $6.3809 \times 10^{-6}$ | $C_{32}$ | $-1.2219 \times 10^{-7}$ | $C_{34}$ | $-5.1663 \times 10^{-7}$ |
| $C_{36}$ | $-4.3203 \times 10^{-7}$ | | | | |

Displacement and tilt(1)

| x | 0.000 | y | 8.622 | z | 21.162 |
| α | 15.00 | β | 0.00 | γ | 0.00 |

Displacement and tilt(2)

| x | 0.000 | y | 0.904 | z | 36.174 |
| α | −11.59 | β | 0.00 | γ | 0.00 |

Displacement and tilt(3)

| x | 0.000 | y | 18.424 | z | 27.483 |
| α | 68.74 | β | 0.00 | γ | 0.00 |

Displacement and tilt(4)

| x | 0.000 | y | 22.618 | z | 30.839 |
| α | 51.48 | β | 0.00 | γ | 0.00 |

Figure 14:
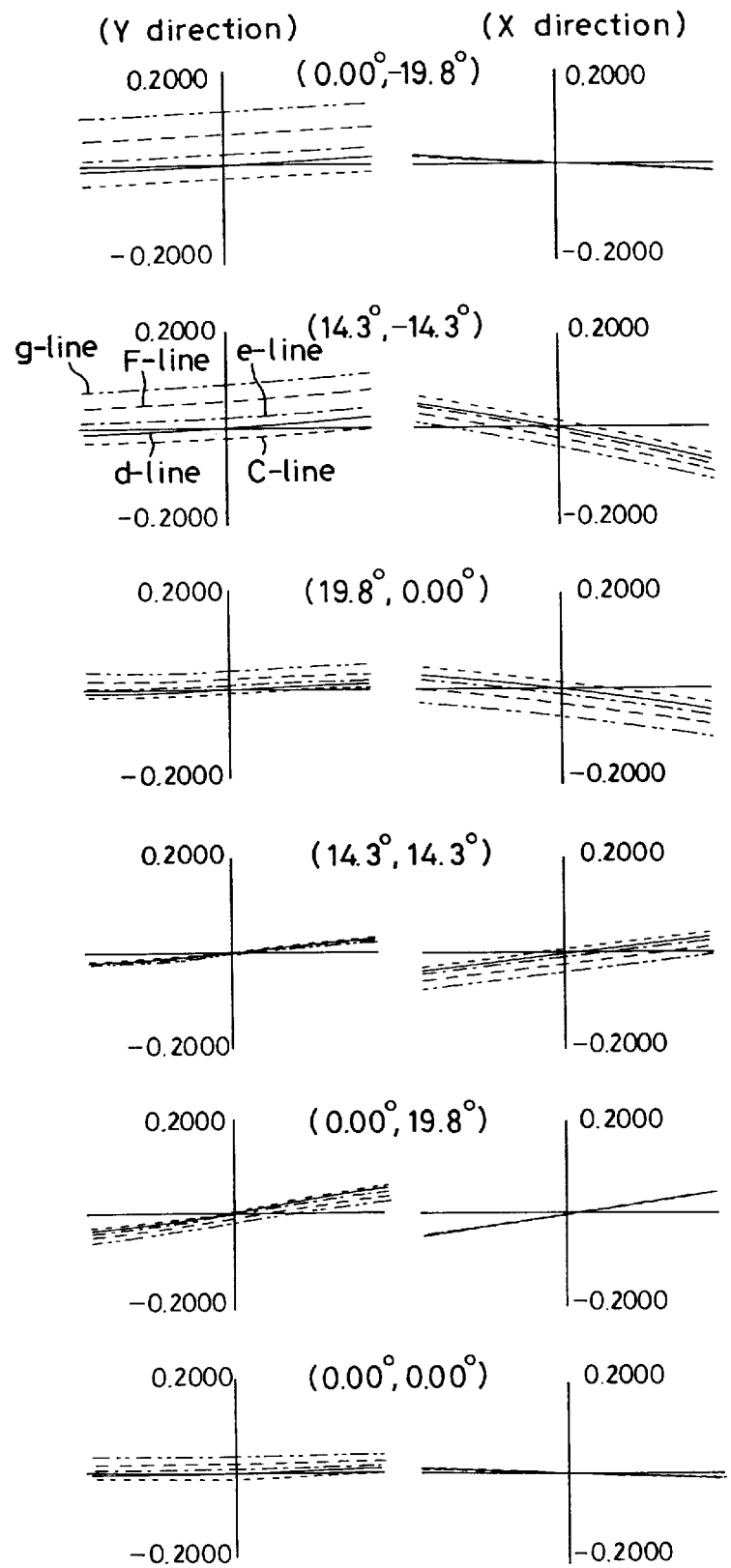
FIG. 14 is an aberrational diagram illustrating lateral aberrations in Example 1 of the present invention.
Figure 15:
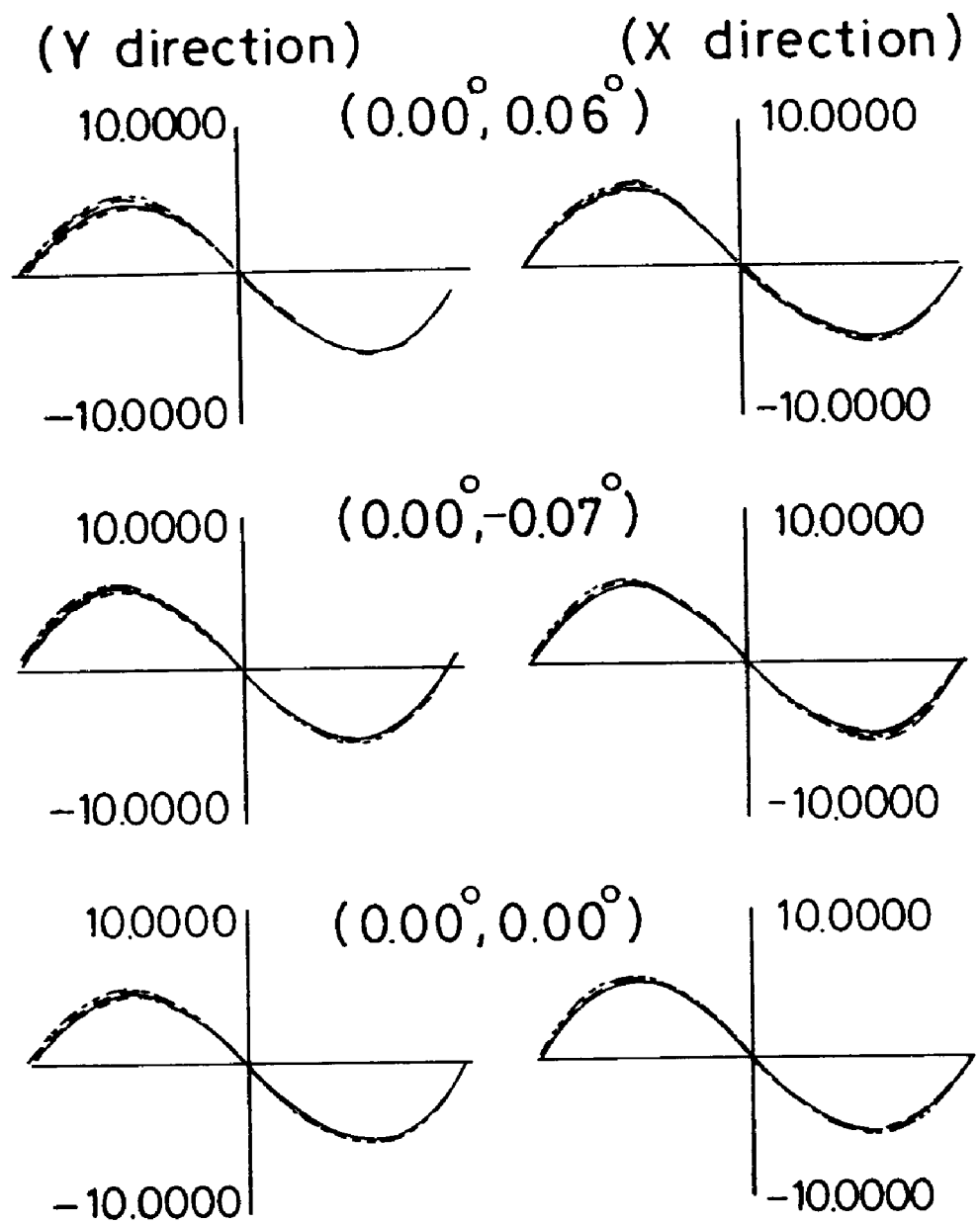
FIG. 15 is an aberrational diagram illustrating pupil aberration in Example 1 of the present invention.

Lateral aberrations in Example 1 are graphically shown in FIG. 14, and pupil aberration in Example 1 is graphically shown in FIG. 15. In these aberrational diagrams, the parenthesized numerals denote [horizontal (X-direction) field angle, vertical (Y-direction) field angle], and lateral aberrations at the field angles are shown.

The values of the parameters concerning the above conditions (A-1) to (I-1) in Examples 1 to 3 of the present invention are as follows:

| | Example 1 | Example 2 | Example 3 |
|---|---|---|---|
| (A-1) | 1.0207 | 1.0312 | 0.9796 |
| (B-1) | 1.2882 | 1.2922 | 1.4873 |
| (C-1) | 1.0186 | 0.9952 | 1.4367 |
| (D-1) | 1.2390 | 1.2591 | 1.0567 |
| (E-1) | −0.0009 | −0.0006 | −0.0118 |
| (F-1) | 0.0059 | 0.0028 | 0.0128 |
| (G-1) | 0.0391 | 0.0211 | −0.0918 |
| (H-1) | 0.0001 | 0.0010 | 0.0003 |
| (I-1) | −0.0372 | −0.0627 | −0.0002 |

Figure 16:
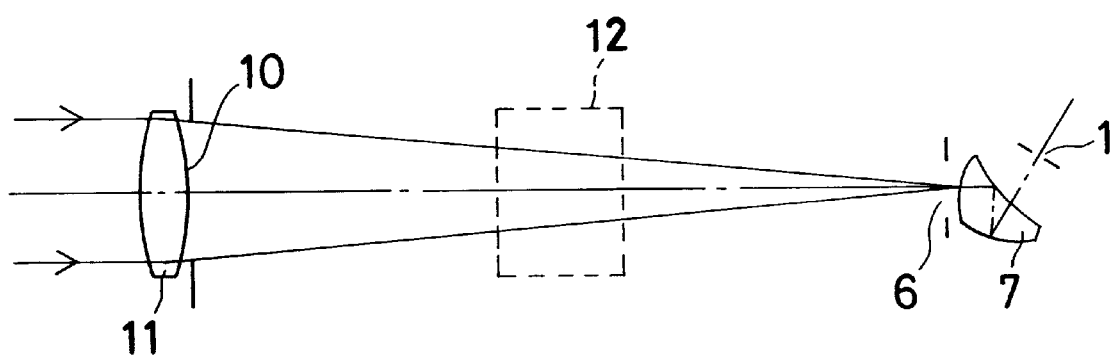
FIG. 16 is a diagram schematically showing an optical system of a telescope, an optical system of a real-image finder, or an optical system for a single eye of a pair of binoculars, in which the decentered prism optical system according to the present invention is used.

The above-described decentered prism optical system according to the present invention can be used as an ocular lens, for example, of a microscope, a telescope, a real-image finder, a camera real-image finder, etc. FIG. 16 is a diagram schematically showing an optical system of a telescope, an optical system of a real-image finder, or an optical system for a single eye of a pair of binoculars. In the case of a real-image finder or a pair of binoculars, an erecting optical element 12, e.g. a Porro prism, a roof prism or a Schmidt prism, is disposed between an objective lens 11 and an ocular lens 7 (decentered prism optical system). In these optical systems, the objective lens 11 forms a first-order image of a distant object on an image plane 6 of a decentered prism optical system 7 used as an ocular lens, and the image is projected into an observer's eyeball through his/her pupil placed at the position of the exit pupil 1 of the decentered prism optical system 7. The exit pupil 10 of the objective lens 11 is formed at the position of the exit pupil 1 after being corrected for aberrations by the decentered prism optical system 7.

Figure 18:
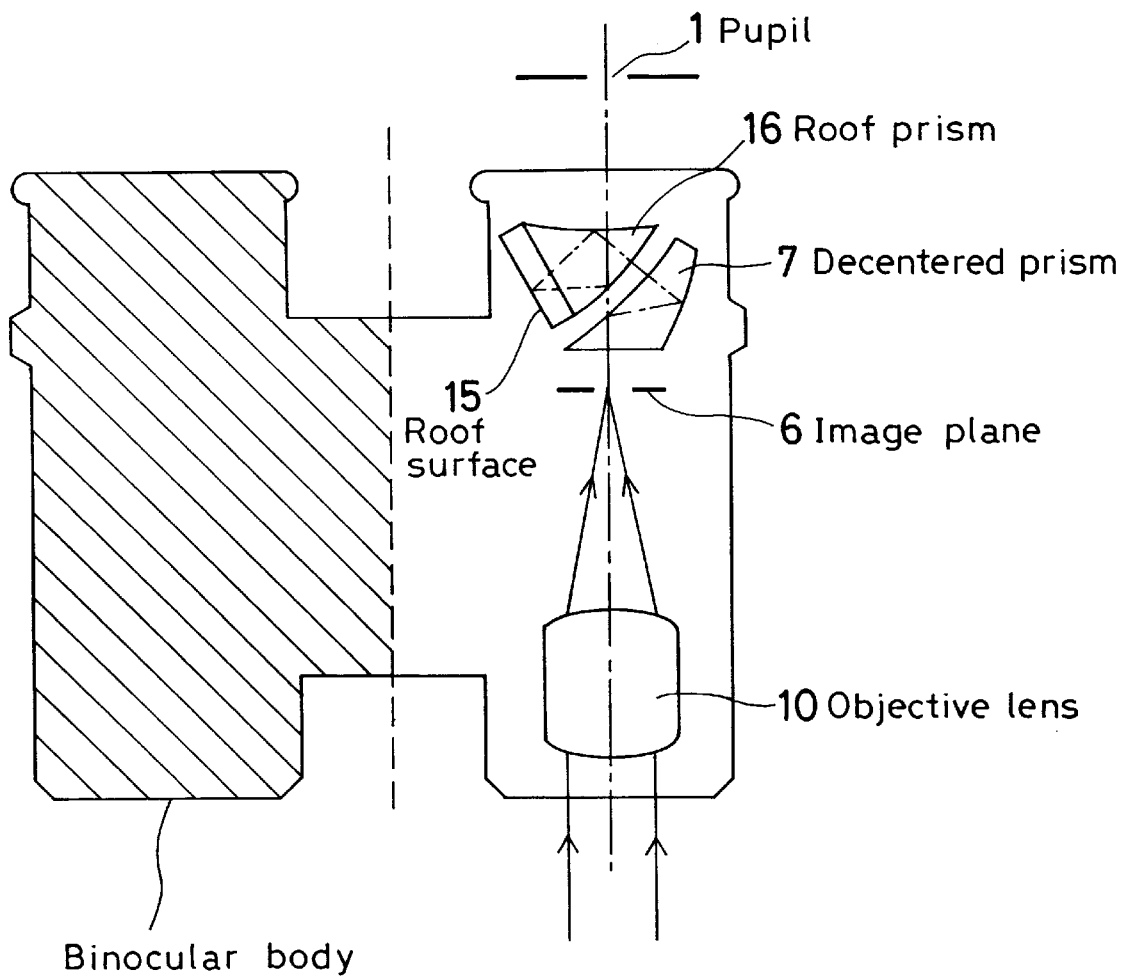
FIG. 18 is a diagram showing another arrangement of a pair of binoculars in which the decentered prism optical system according to the present invention is used.

FIG. 18 is a diagram showing another arrangement of a pair of binoculars, in which only an optical system for a single eye is illustrated. In this case, a roof prism 16 is disposed on the exit side of a decentered prism optical system 7. The roof prism 16 has a roof surface 15 and a free-form surface or an aspherical or spherical surface as at least one surface that constitutes the prism. The decentered prism optical system 7 and the roof prism 16 constitute an image-inverting optical system serving also as an ocular lens and thus provides a direct-view type optical system which enables the visual field to be viewed directly.

Figure 17:
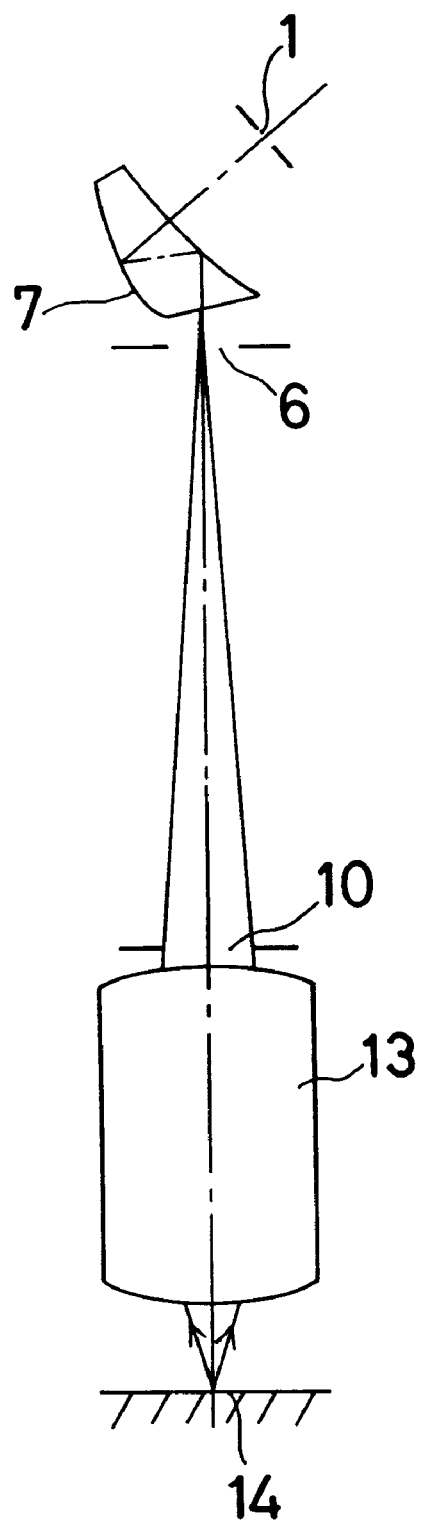
FIG. 17 is a diagram schematically showing an optical system of a microscope which uses the decentered prism optical system according to the present invention.
Figure 19:
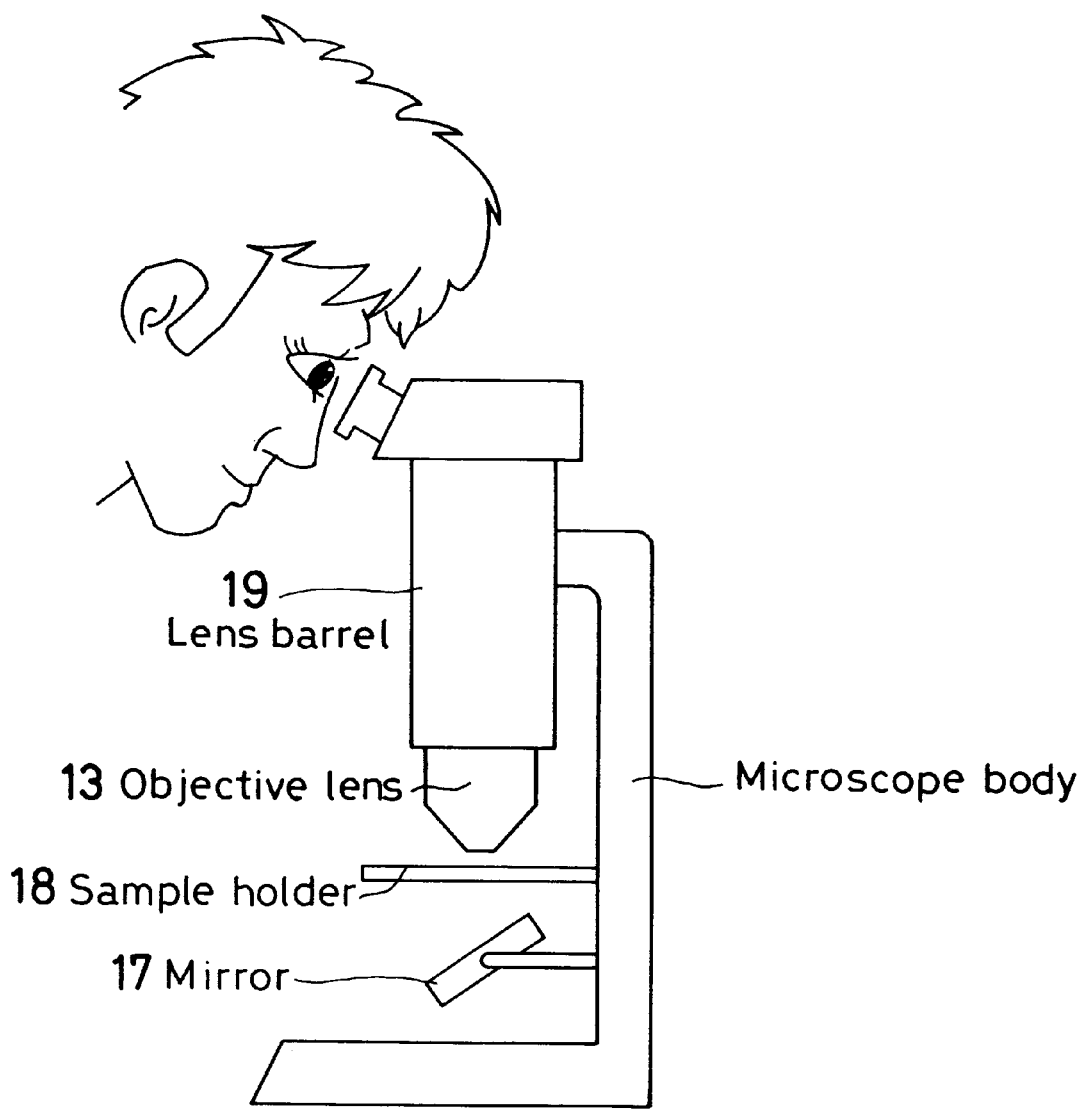
FIG. 19 is a diagram showing the external appearance of a microscope which uses the decentered prism optical system according to the present invention.

FIG. 17 is a diagram schematically showing an optical system of a microscope. In the case of a stereoscopic microscope or a binocular microscope, an erecting prism (not shown) is disposed between an objective lens 13 and an ocular lens 7 (decentered prism optical system). In this optical system, the objective lens 13 forms an enlarged image of a sample 14 on an image plane 6 of the decentered prism optical system 7 used as an ocular lens, and the enlarged image is projected into an observer's eyeball through his/her pupil placed at the position of the exit pupil 1 of the decentered prism optical system 7. Further, the exit pupil 10 of the objective lens 13 is formed at the position of the exit pupil 1 after being corrected for aberrations by the decentered prism optical system 7. FIG. 19 is a diagram showing the external appearance of a microscope according to the present invention in which the decentered prism optical system 7 is used as an ocular lens. The microscope comprises a mirror 17 for taking in illuminating light, a sample holder 18 on which a sample 14 is placed, and a lens barrel 19 for mounting the objective lens 13 and the ocular lens 7.

Figure 20A:
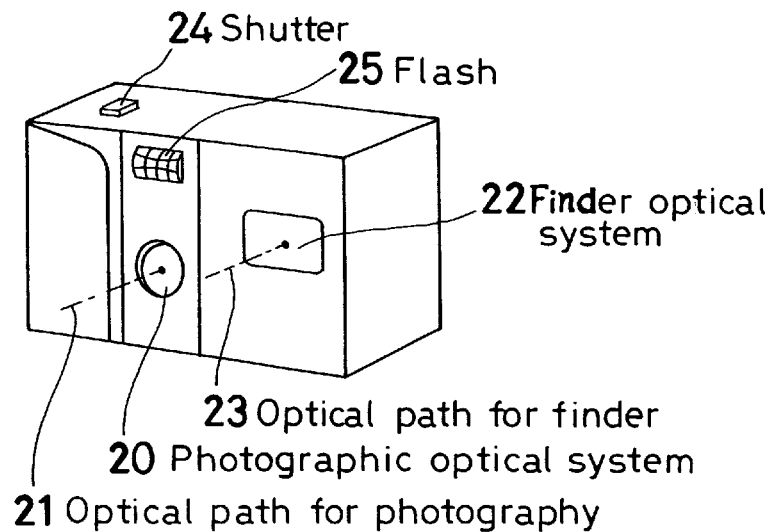
FIGS. 20(a), 20(b), and 20(c) are perspective views of a compact camera having a real-image finder according to the present invention.
Figure 20B:
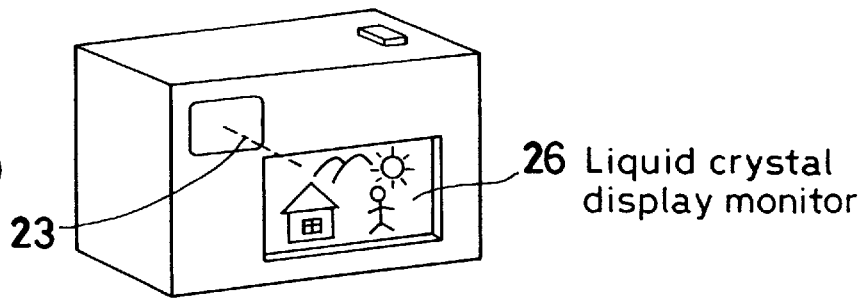
Figure 20C:
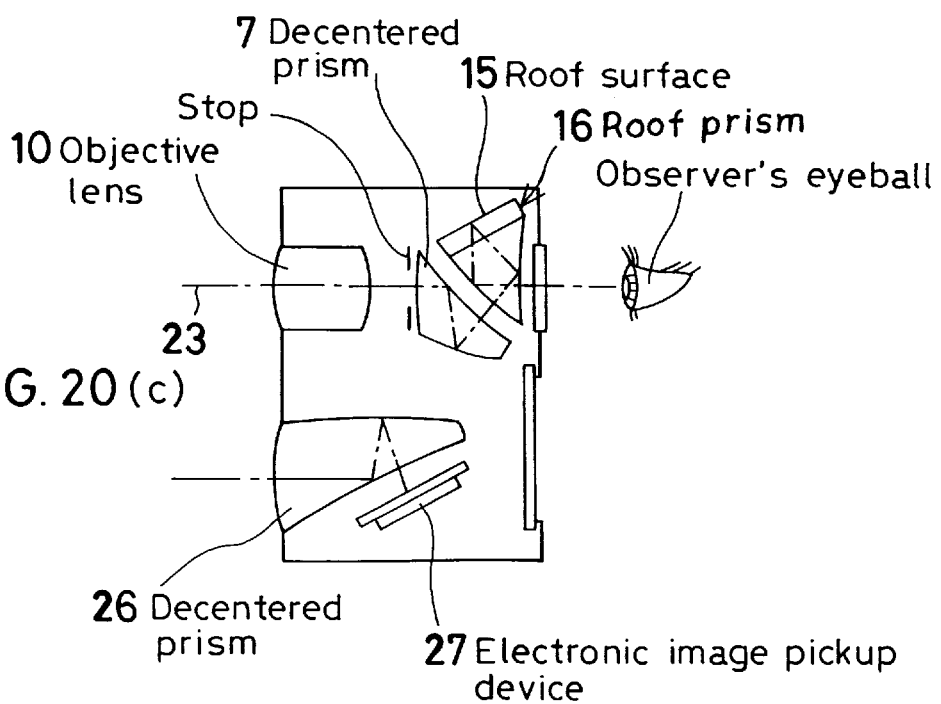
Figure 21A:
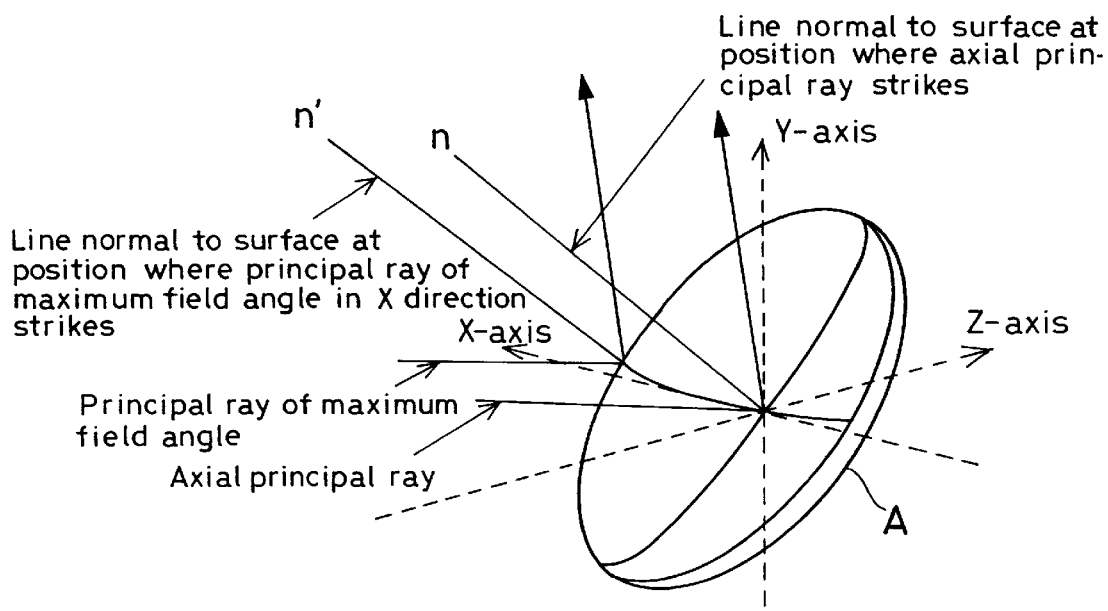
FIGS. 21(a) and 21(b) are diagrams for explaining parameter DY used in the present invention.
Figure 21B:
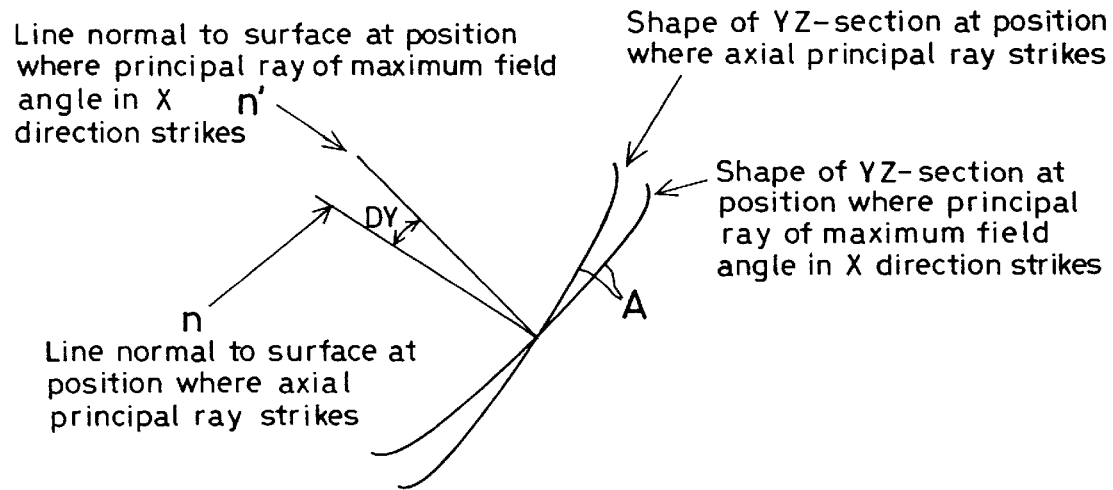

It should be noted that a real-image finder arranged as shown in FIG. 16 can be used in a finder optical system 22 of an electronic camera as shown for example in FIG. 20. In FIG. 20, part (a) is a perspective view of the electronic camera as viewed from the front thereof; part (b) is a perspective view of the electronic camera as viewed from the rear thereof; and part (c) is a ray path diagram showing an optical system of the electronic camera. The electronic camera includes a photographic optical system 20 having an optical path 21 for photography; a finder optical system 22 having an optical path 23 for a finder; a shutter 24, a flash 25; and a liquid-crystal display monitor 26. In the finder optical system 22, a roof prism 16 is disposed on the exit side of a decentered prism optical system 7. The roof prism 16 has a roof surface 15 and a free-form surface or an aspherical or spherical surface as at least one surface that constitutes the prism. The decentered prism optical system 7 and the roof prism 16 constitute an image-inverting optical system serving also as an ocular lens and thus provides a direct-view type finder optical system which enables the visual field to be viewed directly.

In the photographic optical system 20, a decentered prism 26 similar to the decentered prism optical system 7 according to the present invention is used as an objective lens. Light from a subject enters the decentered prism 26 through the third surface thereof, and a subject image is formed on an electronic image pickup device 27 disposed at the rear of the first surface of the prism 26. The subject image taken by the electronic image pickup device 27 or an image recorded in a recording device is displayed on the liquid-crystal display monitor 26.

It should be noted that the decentered prism optical system according to the present invention may be used for only one of the photographic optical system 20 and the finder optical system 22.

The decentered prism optical system according to the present invention can be used as a finder ocular optical system or a photographic optical system of a compact camera for photography in which a photographic film is disposed in place of the electronic image pickup device 27 to take a picture of a subject.

As will be clear from the foregoing description, the present invention makes it possible to provide a decentered prism optical system which is suitable for use as an ocular optical system used in combination with an objective optical system and which is capable of obtaining a clear image having minimal distortion even at a wide field angle and favorably corrected for pupil aberration.

What we claim is:

1. In a prism optical system of the type which receives an image formed by an objective lens, a decentered prism optical system comprising:

a decentered prism having at least three surfaces which are decentered with respect to each other, wherein a space between said at least three surfaces is filled with a transparent medium having a refractive index not smaller than 1.3, and said decentered prism being arranged such that an optical path is reflected at least twice in the optical system, and optical paths of light rays do not intersect each other, wherein at least one reflecting surface has a rotationally asymmetric surface configuration having no axis of rotational symmetry in nor out of the surface, said decentered prism optical system having both a function of optically transmitting a pupil by image formation and a function of optically transmitting an image and being corrected for pupil aberration.

2. A decentered prism optical system according to claim 1, wherein an amount of pupil aberration is not more than 4 millimeters in terms of transverse aberration.

3. A decentered prism optical system according to claim 1, wherein said decentered prism includes a first surface having both a transmitting action through which a bundle of light rays enters said decentered prism or exits therefrom after passing through it and a reflecting action by which the ray bundle is bent in said decentered prism; a second surface disposed to face said first surface; and a third surface having a transmitting action through which the ray bundle exits from said decentered prism after passing through it or enters it, and wherein said second surface has a rotationally asymmetric surface configuration.

4. A decentered prism optical system according to claim 3, wherein said first surface has a rotationally asymmetric surface configuration.

5. A decentered prism optical system according to claim 3, wherein said first surface has a rotationally symmetric surface configuration.

6. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0.7 < FA < 1.3 \qquad \text{(A-1)}$$

where FA is Fx/Fy, said Fx and Fy being defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system.

7. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0.8 < |PxB| < 1.6 \qquad \text{(B-1)}$$

where PxB is Pxn/Px, said Pxn and Px being defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

8. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0.8 < |PyC| < 1.5 \qquad \text{(C-1)}$$

where PyC is Pyn/Py, said Pyn and Py being defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

9. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0.8 < CxyD < 1.5 \qquad \text{(D-1)}$$

where CxyD is a ratio of a curvature Cx2 in an X-axis direction to a curvature Cy2 in a Y-axis direction of said second surface in respective planes containing a line normal to said second surface at a position where said axial principal ray strikes said second surface.

10. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$-0.2 < CyE < 0.2 \tag{E-1}$$

where CyE is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction Y of an effective area of said second surface which is struck by a principal ray passing at a field angle zero in the direction X and at a maximum field angle in a positive direction of the Y-axis is denoted by Cy1, and a curvature in the direction Y of an effective area of said second surface which is struck by a principal ray passing at the field angle zero in the direction X and at a maximum field angle in a negative direction of the Y-axis is denoted by Cy3, and further that a value obtained by dividing a difference between said curvatures Cy1–Cy3 by said Py is denoted by CyE.

11. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$-0.2 < CxF < 0.2 \tag{F-1}$$

where CxF is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction X of an effective area of said second surface which is struck by a principal ray passing at a field angle zero in the direction X and at a maximum field angle in a positive direction of the Y-axis is denoted by Cx1, and a curvature in the direction X of an effective area of said second surface which is struck by a principal ray passing at the field angle zero in the direction X and at a maximum field angle in a negative direction of the Y-axis is denoted by Cx3, and further that a value obtained by dividing a difference between said curvatures Cx1–Cx3 by said Px is denoted by CxF.

12. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$0 \leq |DY| < 1 \; (°) \tag{G-1}$$

where DY denotes an angle formed in a YZ-plane between a line normal to said second surface at a point where a principal ray at a maximum field angle in the direction X intersects said second surface and a line normal to said second surface at a point where said axial principal ray intersects said second surface.

13. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$-0.2 < CyH < 0.2 \tag{H-1}$$

where CyH is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction Y of an effective area of said first surface which is struck by a principal ray passing at a field angle zero in the direction X and at a maximum field angle in a positive direction of the Y-axis is denoted by Cy1, and a curvature in the direction Y of an effective area of said first surface which is struck by a principal ray passing at the field angle zero in the direction X and at a maximum field angle in a negative direction of the Y-axis is denoted by Cy3, and further that a value obtained by dividing a difference between said curvatures Cy1–Cy3 by said Py is denoted by CyH.

14. A decentered prism optical system according to claim 3, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y-axes is defined as an X-axis, the following condition is satisfied:

$$-0.2 < CxI < 0.2 \qquad (I-1)$$

where CxI is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction X of an effective area of said first surface which is struck by a principal ray passing at a field angle zero in the direction X and at a maximum field angle in a positive direction of the Y-axis is denoted by Cx1, and a curvature in the direction X of an effective area of said first surface which is struck by a principal ray passing at the field angle zero in the direction X and at a maximum field angle in a negative direction of the Y-axis is denoted by Cx3, and further that a value obtained by dividing a difference between said curvatures Cx1–Cx3 by said Px is denoted by CxI.

15. A decentered prism optical system according to claim 2, wherein said decentered prism includes a first surface having both a transmitting action through which a bundle of light rays enters said decentered prism or exist therefrom after passing through it and reflecting action by which the ray bundle is bent in said decentered prism; a second surface disposed to face said first surface; and a third surface having a transmitting action through which the ray bundle exits from said decentered prism after passing through it or enters it, and wherein said second surface has a rotationally asymmetric surface configuration.

16. A decentered prism optical according to claim 15, wherein said first surface has a rotationally asymmetric surface configuration.

17. A decentered prism optical system according to claim 15, wherein said firsrt surface has a rotationally symmetric surface configuration.

18. A decentered prism optical according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axis is defined as an X-axis, the following condition is satisfied:

$$0.7 < FA < 1.3 \qquad (A-1)$$

where FA is Fx/Fy, said Fx and Fy being defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e., a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e., a value of a sine of an angle formed between said light ray and said axial principal ray) is defined as a focal length FY in the direction Y of the entire optical system.

19. A decentered prism optical system according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$0.8 < |PxB| < 1.6 \quad (B-1)$$

where PxB is Pxn/Px, said Pxn and Px being defined such that, ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by and NA of said light ray exiting from said optical system (i.e. a value of a sine of an angle formed between said light ray and said axial principal ray) is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

20. A decentered prism optical system according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$0.8 < 1PyC1 < 1.5 \quad (C-1)$$

where PyC is Pyn/Py, said Pyn and Py being defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system(i.e. a value of a sine of an angle formed between said light ray and said axial principal ray) is defined as a focal length Fy in the direction Y of the entire optical system, and that refracting powers in the directions X and Y of said second surface at a position where said axial principal ray strikes said second surface are denoted by Pxn and Pyn, respectively, and reciprocals of said focal lengths Fx and Fy in the directions X and Y are denoted by Px and Py, respectively.

21. A decentered prism optical system according to claim 15, wherein, assuming that a Z-axis is define by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$0.8 < CxyD < 1.5 \quad (D-1)$$

where CxyD is a ratio of a curvature Cx2 in an X-axis direction to a curvature Cy2 in a Y- axis direction of said second surface in respective planes containing a line normal to said second surface at a position where said axial principal ray strikes said second surface.

22. A decentered prism optical system according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$-0.2 < CyE < 0.2 \quad (E-1)$$

where CyE is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction Y of an effective area of said second surface which is struck by a principal ray passing at a field angle zero in the direction X and at a maximum field angle in a positive direction of the Y- axis is denoted by Cy1, and a curvature in the direction Y of an effective area of said second surface which is struck by a principal ray passing at the field angle zero in the direction of the X- and at a maximum field angle in a negative direction of the Y-axis is denoted by Cy3, and further that a value obtained by dividing a difference between said curvatures Cy1–Cy3 by said Py is denoted by CyE.

23. A decentered prism optical system according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is define as a Y-axis, and further that an axis perpendicularly intersecting both the Z- and Y- axes is defined as an X-axis, the following condition is satisfied:

$$-0.2 < CxF < 0.2 \tag{F-1}$$

where CxF is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of and entire optical system, and in ray tracing of a light ray which passes through a point that is the distance H away from the pupil center in a direction of the Y-axis and which enters said optical system in parallel to said axial principal ray, a value obtained by dividing said distance H by and NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction X of an effective area of said second surface which is struck by a principal ray passing at a field angle zero in the direction X and at a maximum field angle in a positive direction of the Y- axis is denoted by Cx1, and a curvature in the direction X of an effective area of said second surface which is struck by a principal ray passing at the field angle zero in the direction X and at a maximum field angle in a negative direction of the Y-axis is denoted by Cx3, and further that a value obtained by dividing a difference between said curvatures Cx1–Cx3 by said Px is denoted by CxF.

24. A decentered prism optical system according to claim 15, wherein, assuming that Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the z-axis in a decentration plane of each surface constituting said decentered prism optical system is defined as a Y-axis, and further that an axis perpendicularly intersecting both the Z- and Y- axes is defined as an X-axis, the following condition is satisfied:

$$0 \le |DY| < 1 \; (°) \tag{G-1}$$

where DY denotes and angle formed in a YZ-plane between a line normal to said second surface at a point where a principal ray at a maximum field angle in the direction X intersects said second surface and a line normal to said second surface at a point where said axial principal ray intersects said second surface.

25. A decentered prism optical system according to claim 15, wherein assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$-0.2 < CyH < 0.2 \tag{H-1}$$

where CyH is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by and NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by and NA of said light ray exiting from said optical system (i.e. a value of a sine of an angle formed between said light ray and said axial principal ray) is defined as a focal length Fy in the direction Y of the entire optical system, and that reciprocals of said focal lengths Fx and Fy in the directions X and Y are denoted by Px and Py, respectively, and further that a curvature in the direction Y of an effective area of said first surface which is struck by a principal ray passing at a field angle zero in the direction X and at a maximum field angle in a positive direction of the Y- axis is denoted by Cy1, and a curvature in the direction Y of an effective area of said first surface which is struck by a principal ray passing at the field angle zero in the direction X and at a maximum field angle in a negative direction of the Y-axis is denoted by Cy3, and further that a value obtained by dividing a differece between said curvatures Cy1–Cy3 by said Py is denoted by CyH.

26. A decentered prism optical system according to claim 15, wherein, assuming that a Z-axis is defined by a straight line along which an axial principal ray passing through a center of a pupil of said decentered prism optical system and reaching a center of an image plane travels after exiting from said pupil until it intersects a first surface of said decentered prism optical system, and that an axis perpendicularly intersecting the Z-axis in a decentration plane of each surface constituting said decentered prism optical system is defined as a Y-axis, and further that an axis perpendicularly intersecting both the Z- and Y- axes is defined as an X-axis, the following condition is satisfied:

$$-0.2 < CxI < 0.2 \quad (I\text{-}1)$$

where CxI is defined such that, in ray tracing of a light ray which passes through a point that is a slight distance H away from the pupil center in a direction of the X-axis in parallel to said axial principal ray and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fx in the direction X of an entire optical system, and in ray tracing of a light ray which passes through a point that is the distance H away from the pupil center in a direction of the Y-axis and which enters said optical system in parallel to said axial principal ray, a value obtained by dividing said distance H by an NA of said light ray exiting from said optical system (i.e. a value of a sine of an angle formed between said light ray and said axial principal ray) is defined as a focal length Fy in the direction Y of the entire opical system, and that reciprocals of said focal lengths Fx and Fy in the directions X and Y are denoted by Px and Py, respectively, and further that a curvature in the direction X of an effective area of said first surface which is struck by a principal ray passing at a field angle zero in the direction X and at a maximum field angle in a positive direction of the Y- axis is denoted by Cx1, and a curvature in the direction X of an effective area of said first surface which is struck by a principal ray passing at the field angle zero in the direction X and at a maximum field angle in a negative direction of the Y-axis is denoted by Cx3, and further that a value obtained by dividing a difference between said curvatures Cx1–Cx3 by said Px is denoted by CxI.

27. A decentered prism optical system according to any one of claims 1 to 14, or 15 to 26, which is used as an ocular optical system of a telescope having an objective optical system and an ocular optical system.

28. A decentered prism optical system according to any one of claims 1 to 14, or 15 to 26, which is used as an ocular optical system of a real-image finder having an objective optical system and an ocular optical system.

29. A decentered prism optical system according to claim 28, wherein said real-image finder is used as a finder optical system of an image pickup apparatus, e.g. a camera, in which a photographic optical system and a finder optical system are provided as separate optical systems in a side-by-side relation to each other.

30. A decentered prism optical system according to any one of claims 1 to 14, or 15 to 26, which is used as an ocular optical system of a microscope having an objective optical system and an ocular optical system.

* * * * *

UNITED STATES PATENT AND TRADEMARK OFFICE
CERTIFICATE OF CORRECTION

PATENT NO.   : 6,104,539
DATED        : August 15, 2000
INVENTOR(S)  : Togino

Page 1 of 1

It is certified that error appears in the above-identified patent and that said Letters Patent is hereby corrected as shown below:

Title page,
Please add: -- [30] Foreign Application Priority Date
  Apr. 8, 1997 [JP] Japan..........................089466 --

Signed and Sealed this

Fifth Day of March, 2002

Attest:

Attesting Officer

JAMES E. ROGAN
Director of the United States Patent and Trademark Office